United States Patent
Bekanich

(10) Patent No.: US 10,102,736 B2
(45) Date of Patent: Oct. 16, 2018

(54) SURVIVAL EMERGENCY LOCATION TRANSMITTER TRACKING SYSTEM

(71) Applicant: Joseph Bekanich, Exeter, PA (US)

(72) Inventor: Joseph Bekanich, Exeter, PA (US)

(73) Assignee: InFlight Labs, LLC, Broomfield, CO (US)

(*) Notice: Subject to any disclaimer, the term of this patent is extended or adjusted under 35 U.S.C. 154(b) by 0 days.

(21) Appl. No.: 15/959,867

(22) Filed: Apr. 23, 2018

(65) Prior Publication Data
US 2018/0247519 A1 Aug. 30, 2018

Related U.S. Application Data

(60) Division of application No. 15/268,525, filed on Sep. 16, 2016, now Pat. No. 10,002,519, which is a continuation of application No. 13/717,707, filed on Dec. 18, 2012.

(51) Int. Cl.
| | |
|---|---|
| *G08B 25/00* | (2006.01) |
| *H04B 7/185* | (2006.01) |
| *G08G 5/00* | (2006.01) |
| *G08B 25/10* | (2006.01) |
| *B64D 45/00* | (2006.01) |

(52) U.S. Cl.
CPC ......... *G08B 25/006* (2013.01); *G08B 25/005* (2013.01); *G08B 25/10* (2013.01); *G08G 5/0013* (2013.01); *G08G 5/0021* (2013.01); *G08G 5/0056* (2013.01); *H04B 7/18506* (2013.01); *B64D 2045/0045* (2013.01)

(58) Field of Classification Search
CPC .... G08B 25/006; G08B 25/005; G08B 25/10; G08G 5/0013; G08G 5/0021; G08G 5/0056; G08G 5/0078; H04B 7/18506; B64D 2045/0045
See application file for complete search history.

(56) References Cited

U.S. PATENT DOCUMENTS

| | | | | |
|---|---|---|---|---|
| 6,385,513 | B1* | 5/2002 | Murray | H04B 7/18508 340/945 |
| 7,630,710 | B2* | 12/2009 | Kauffman | H04B 7/18506 340/531 |
| 9,403,602 | B1* | 8/2016 | Heinrich | B64D 45/00 |
| 2003/0225492 | A1* | 12/2003 | Cope | G07C 5/008 701/33.4 |
| 2004/0160340 | A1* | 8/2004 | Thomson | B64D 45/0015 340/945 |
| 2016/0054425 | A1* | 2/2016 | Katz | G01S 3/14 342/417 |

* cited by examiner

*Primary Examiner* — Steven Lim
*Assistant Examiner* — Mancil Littlejohn, Jr.
(74) *Attorney, Agent, or Firm* — Joseph Stecewycz

(57) ABSTRACT

The invention is a service for sending and/or receiving messages in a first format intended for a recipient or authority, where the service identifies for the intended recipient a second format for receiving messages, and where the service formats a communication for delivery to the intended recipient, where the message is prepared to be presented to the recipient in the first and/or the second format.

30 Claims, 29 Drawing Sheets

Issue: There is a long string of flight errors due to language barriers of US and International Pilots

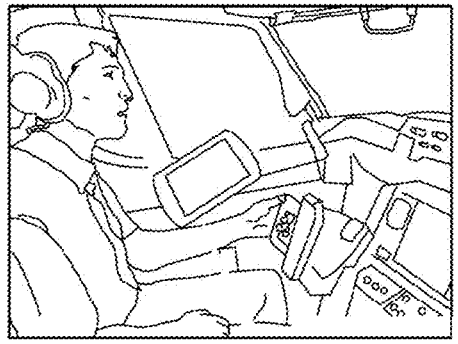 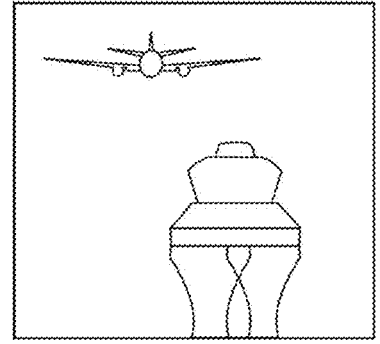

Speech-to-Text Display of Communication between Air Traffic Controllers and Pilots iPad is the only device that the FFA allows in the cockpit... iPad is now being used to replace paper charts it will have a mounting bracket like other instruments A visual Display of the Communication stated by the air traffic controller to the Pilot and vice-versa will eliminate confusion with language barriers

FIG. 21

Barcode Reader or like Device can update the INFLIGHT911 Services contact, Profile and Flight Information.

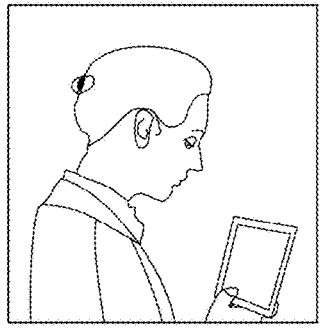 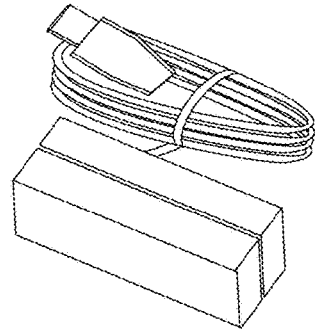

Computer-impltemented method can receive airplane flight and destination and personnel data from a ground, geo-location or in-plane source the computer-implemented method can be updated by barcode reader, biometric-ID or similar technologies critical profile information is embedded in every message sent or received

FIG. 23

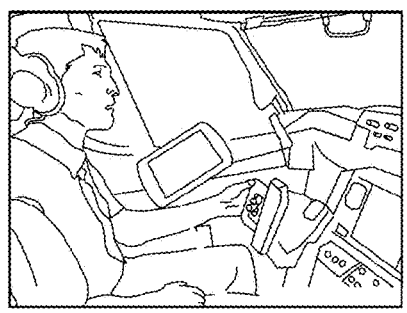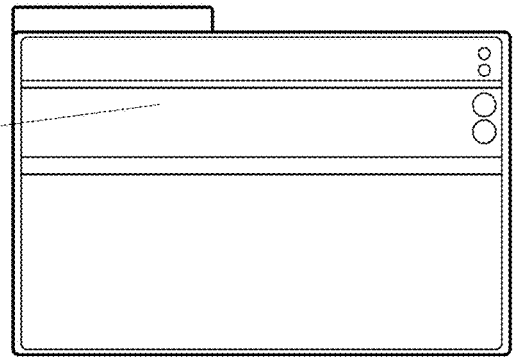
FIG. 25

MESSAGE LIBRARY: Allows for pre-defined messages
To populate the Message Window with one click Sample of broadcast message

InFlight Emergency Message

Message: An Emergency Message can be typed here and sent to the Inflight 911 Services™ administrative team and simultaneously transmitted to 100 "+" government personnel

Flight Details: To: Dallas, TX – DFW From: Washington, DC – IAD Airlines: Other (Enter in Message Body) Flight #: 777 Problem: Terrorist Threat

Sender Details: Pilot's First Name: FRANZ, Pilot's Last Name: KELP, Age: 44, Pilot's FAA License #: 34-AZ3435607223, Address: 234 ROLL ST., State: PA, Zip: 18704, Mobile #: 6705654434, Home #: 6705654434, Email Address: FKelp@SomeAirline.com, Doctor's Name: ZOOM, Doctor's Phone: 3432321212, Emergency Contact Name: KAREN, Emergency Phone #: 9087875566

FIG. 28

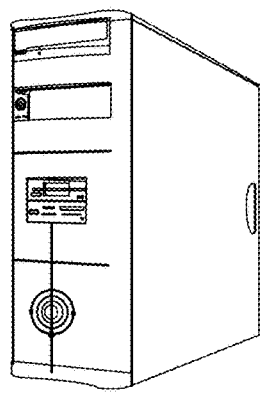

Computer-implemented method may contain a redundant back up of all communication is stored in an alternate format is distributed in a time interval or after every time "Send" is queued on the computer-implemented method interface... example... a interface conversation loses Wi-Fi Connection... the alternate formatted information may be sent to the distribution List as a secondary means of redundant communication

FIG. 29

SURVIVAL EMERGENCY LOCATION TRANSMITTER TRACKING SYSTEM

REFERENCE TO RELATED APPLICATIONS

This application is a divisional of U.S. application Ser. No. 15/268,525, filed Sep. 16, 2016, which is a continuation of U.S. application Ser. No. 13/717,707, filed Dec. 18, 2012.

FIELD OF THE INVENTION

The present invention relates to a computer-implemented method for communicating emergency information from an aircraft.

BACKGROUND OF THE INVENTION

Consumers have their choice of numerous different communication technologies. The Internet and the World Wide Web, i.e., the Web, have become ubiquitous. Persons of all ages and backgrounds use the Web in connection with virtually all aspects of their lives—work, school, business, and entertainment. Email has likewise become pervasive with many users maintaining multiple email addresses. More recently, alternative communication technologies have gained acceptance. For example, texting, instant messaging, and short messaging service, real-time audio/video communication or recording are now widely used. This is particularly true amongst younger individuals.

The penetration of these various communication technologies has taken place with the simultaneous acceptance of a wide array of various communication devices. For example, many consumers have abandoned wireline phones for wireless phones. Personal digital assistants (PDA's), tablet PC's, and the like have become the preferred communication device for many.

Conventionally, consumers employ any one of the various communication technologies to communicate with others who are using the same communication technology. For example, persons who use text messaging send text messages to others that use text messaging. Persons send emails to others that receive emails. People place digital wireless telephone calls to others who use telephony for voice and video communication.

BRIEF SUMMARY OF THE INVENTION

Applicants disclose systems and methods for communicating messages to recipients in a format other than that in which the message was received. Using the systems and methods disclosed herein, users are able to send a communication or message in a first format and have the communication or message received by the recipient in a second format. For example, a user may enter the text of a message into a Web interface, and have the message delivered to the recipient as an instant message. Similarly, a user may enter an instant message using a phone, and have the message delivered as an email or real-time audio/video communication or recording.

In an illustrative embodiment, Applicant discloses receiving a message in a first digital format from a user. The message is typically directed to at least one individual and may be directed to a plurality or group of individuals. In an exemplary embodiment, a message may be received from a Web text box, but any suitable technology for creating and forwarding a communication or message such as, for example, text or email, real-time audio/video communication or recording may be used.

In the illustrative embodiment, the system determines a second digital format for delivering the message to the individual. For example, for a message that may have been entered into a Web page, an embodiment of the disclosed system may determine that the message should be delivered using instant messaging. Alternatively, the system may determine the message should be delivered using a digital voice representation of the text. The decision as to which format should be used for delivery of the message may be made by any suitable mechanism. For example, the system may refer to the user's predefined preferences, or may refer to the format used in past communications with the particular recipient, in order to select a format for the intended recipient.

The message is then transmitted or communicated for delivery to the intended recipient. Any suitable mechanism or technology for transmitting or communicating the message may be used. For example, a message that is intended to be delivered as a text message on a wireless device may be forwarded to the appropriate wireless carrier. Similarly, where the message is intended to be delivered as an email, an email may be forwarded to the appropriate email domain.

According to an aspect of the disclosed embodiments, users may schedule the delivery of messages for communication on a particular day and at a particular time. In a disclosed embodiment, the system monitors for the particular day and time specified for delivery, formats the message for delivery in the appropriate format, and communicates the message on the appropriate date and time.

The disclosed methods may be applied to particular markets or to a particular technical limitation. For example, the disclosed methods may provide communications to individuals who are traveling on a commercial vehicle such as, for example, a commercial airliner or train. Such technology may be particularly suitable for use on commercial airliners where use of mobile phones is prohibited. In such a scenario, users may prepare messages using a Web interface and have the message delivered in a different format such as, for example a text message or instant message. The capability to communicate messages while in-transit may be particularly useful in order to address in-flight emergencies. For example, a passenger on a commercial airliner who is experiencing an emergency situation may prepare a message regarding the emergency using a Web based interface. The message may be communicated in another format, such as for example a phone call, email, or sort message or real-time audio/video communication or recording to emergency and law enforcement personnel.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTIONS OF THE DRAWINGS

The foregoing aspects, uses, and advantages of the present invention will be more fully appreciated as the same becomes better understood from the following detailed description of the present invention when viewed in conjunction with the accompanying figures, in which:

FIGS. 11-29 depict various aspects of potential embodiments of the disclosed systems and methods;

DETAILED DESCRIPTION OF THE INVENTION

Users of existing communication technologies generally use any one of several technologies to communicate with others that use the same communication technology. For example, text messaging is used to communicate a text message to a recipient who is also using text messaging. Similarly, an email program is used to communicate an email to an intended recipient who is also using email. Thus, although there are numerous communication technologies and devices available to consumers, the technologies are used independently of each other. According to existing systems and methods, a user of a Web interface does not communicate with a recipient that is using instant messaging. Similarly, a recipient of an instant message does not respond to a sender who is using an email interface.

Applicants disclose systems and methods for performing cross-format messaging. Using the systems and methods disclosed herein, users are able to send a communication or message in a first format and have the communication or message received by the recipient in a second format. For example, a user may enter the text of a message into a Web interface, and have the message delivered to the recipient as a text message. Similarly, a user may enter an instant message using a phone, and have the message delivered as an email or real-time audio/video communication or recording.

Example Computing Arrangement

Figure 1:
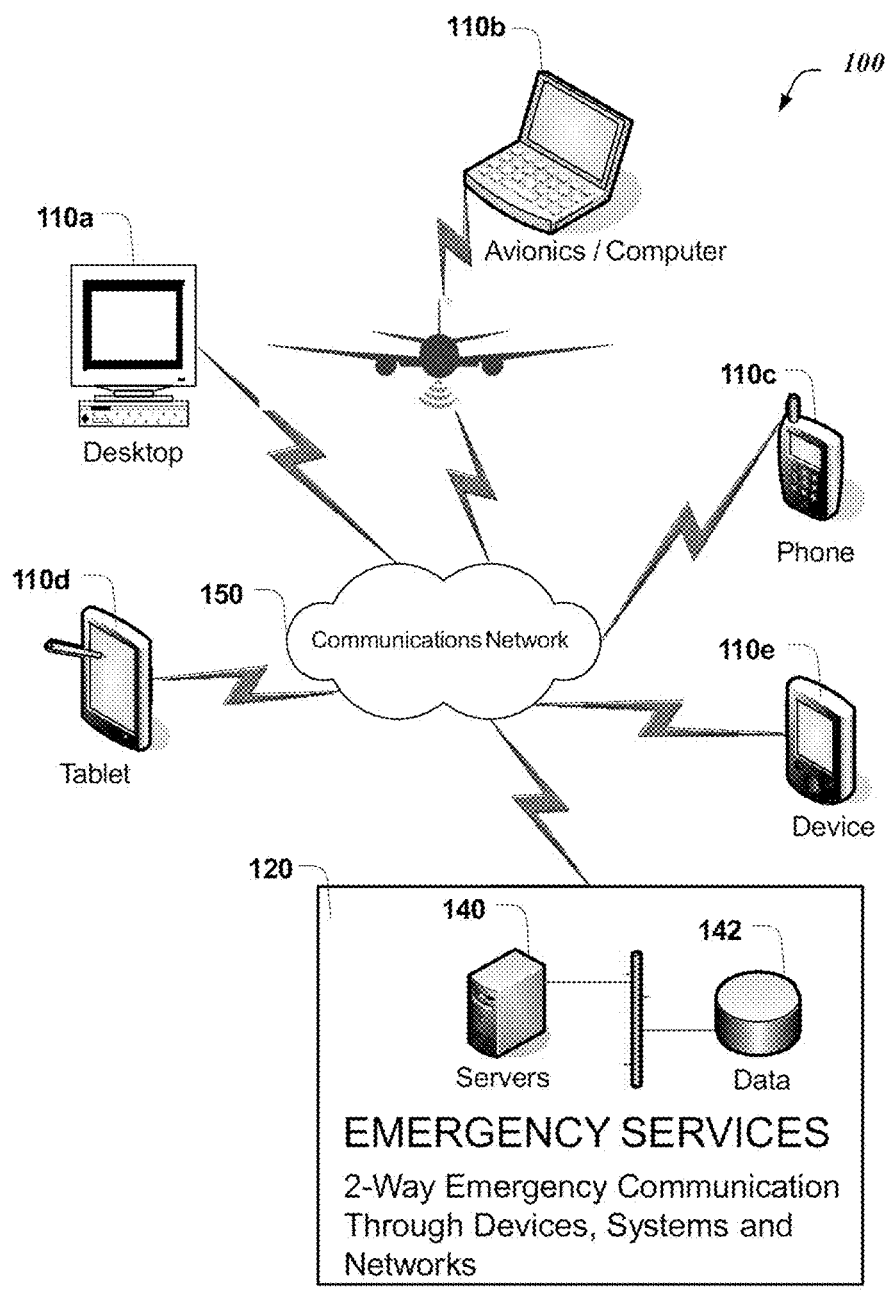
FIG. 1 is a block diagram of an illustrative computing arrangement in which aspects of the subject matter described herein may be implemented.

FIG. 1 illustrates an exemplary computing network 100 suitable for message communication. Message service 120 offers a number of different functions including communicating messages to a recipient in a format other than one in which the message was initially created. Users employ computing devices 110a-e to create messages which may be communicated to and through message service 120 via communications network 150.

In an exemplary environment, message service 120 provides the capability to receive a message in a first format and to format a message for an intended recipient in a second format. For example, service 120 may receive a message as text that was input trough a Web page, and format the message to be communicated to the intended recipient as an instant message. The cross-format messaging functionality as described herein is performed on computing servers 140 which communicate with data stores 142, which may be accessed locally or remotely. Data stores 142 maintain data regarding individual users of the system and the messages that they send and receive. Computing servers 140 provide functionality as described below to receive messages, identify an appropriate format for a message, and communicate the message so as to be received in the identified format. Any number of servers 140 and data stores 142 may be used to provide a cross-format service as described herein.

Message service 120 is accessible via communications network 150. Communications network 150 may be any type of network that is suitable for providing communications between computing devices 110a-e and service 120. Moreover, communications network 150 may comprise a combination of discrete networks which may use different technologies. For example, communications network 150 may comprise local area networks (LANs), wide area networks (WAN's), cellular networks, or combinations thereof. Communications network 150 may comprise wireless, wireline, or combination thereof. In an exemplary embodiment, communications network 150 comprises the Internet and may additionally comprise any networks adapted to communicate with the Internet. In one exemplary embodiment, communications network 150 may comprise a network that enables passengers on a commercial airline to communicate with servers 140.

Persons that wish to send and receive messages via message service 120 may do so using computing devices 110a-e. Computing devices 110a-e may be any type of device that is operable to communicate with service 120. For example, computing devices 110a-e may be desktop computers, laptop computers, wireless phones, personal digital assistants, tablet computers, media players, etc. While only five devices are illustrated in FIG. 1, it is understood that service 120 may be accessed via any number of computing devices 110a-e.

Computing arrangement 100 may employ a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computing device, such as one of devices 110a-e that accesses shared network resources provided by another computer (i.e., a server). A server, such as device 140, is typically a remote computer system accessible over a remote network such as the Internet. The client process may be active in a first computer system, and the server process may be active in a second computer system, communicating with one another over a communications medium and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

Figure 2:
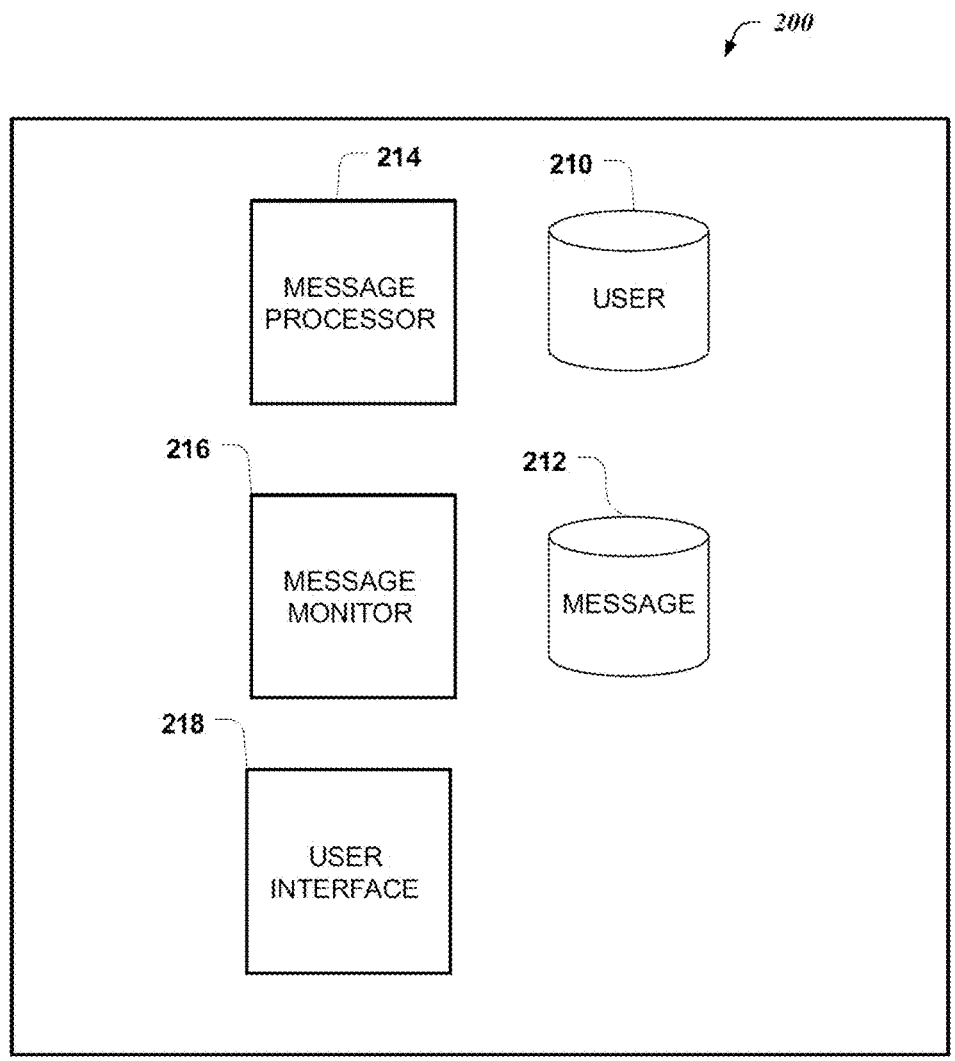
FIG. 2 is a block diagram illustrating functional components of an illustrative computing arrangement.

FIG. 2 depicts a block diagram of exemplary logical components of an illustrative service 120 for performing cross-format message communication. Illustrative service 120 comprises or has access to user store or database 210. User store 210 comprises information about the various users of the service. In an illustrative embodiment, for example, user store 120 may comprise identifying information about the particular user. More particularly, user store 120 may comprise a user identifier, a password, a name, one or more email addresses, and a mobile phone number. In an exemplary embodiment, user store 210 may further comprise for each user a list of contracts that the user communicates. The information for each contact may comprise a name, user identifier, and a mobile phone number. The user store 210 may still further comprise information about a list of contacts that have been grouped together into a distribution list for a message.

In an exemplary embodiment, message store 212 stores information about messages that have been communicated from or received by users. For example, the information may comprise a message identifier, an identifier for the sender, a recipient of the message, and a date and time the message was sent or received.

Service 120 further comprises message processor 214 which operates to receive messages, determine the format intended for receipt of the messages, and forward messages as described herein. Message monitor 216 operates with message processor 214 to identify when scheduled messages are to be delivered and to initiate the forwarding of such messages. User interface service 218 operates to provide a user interface for creating and receiving messages. In an exemplary embodiment, for example, user interface server 218 generates data for creating a web page through which users may enter message text, schedule the delivery of the message text, and review messages forwarded by others.

Message Processing

Figure 3:
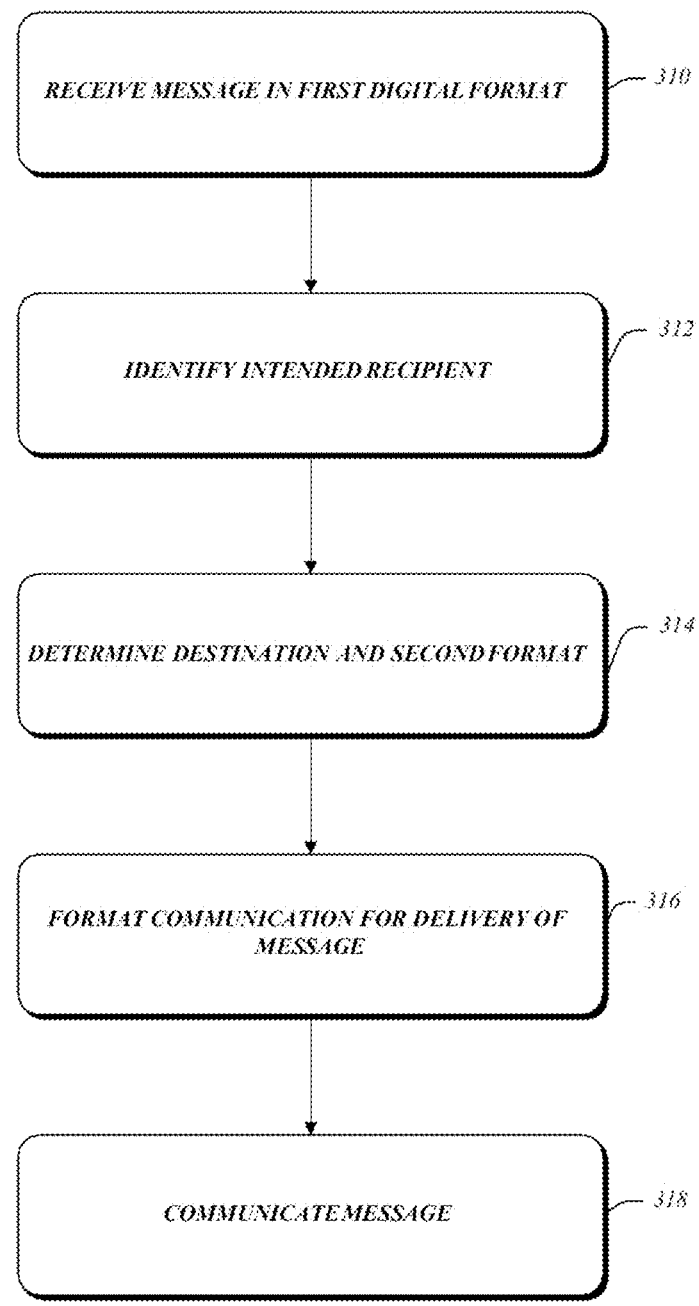
FIG. 3 is a flow diagram of an illustrative process for processing requests to communicate a message.

FIG. 3 is a flowchart of an example process for communicating electronic messages. At step 310, message processor 214 receives a message that is to be communicated. The message is received in a first format which may be, for example, text entered into a Web page, an email, a text message, an instant message, a sort messaging service message, a digital voice recording, or real-time audio/video communication or recording etc. In one exemplary scenario, the message may be received as text that was entered into a Web page. In connection with receiving a message, message processor 214 updates.

At step 312, message processor 214 identifies the intended recipient of the message. For example, the message may be intended for receipt by an individual identified in a contact list. Message processor 214 identifies the intended recipient by, for example, parsing information received with the message and querying user database 210. For example, the message may identify an intended recipient using an identifier. Message processor 214 queries user database 210 in order to identify the contact associated with the identifier. In an exemplary scenario, a message may also be intended for receipt by a group of individuals or a distribution list. At step 312, message processor 214 identifies the individuals in the distribution list by querying user database 210.

At step 314, message processor 214 determines the destination for the message and the appropriate format. For example, an intended recipient may have a particular format in which it has been determined that they should receive messages, and identified a particular device on which the recipient should be contacted. In an example scenario, the recipient may have defined that she wishes to receive messages as an instant message on a wireless phone that has a particular phone number. In an exemplary scenario, message processor 214 queries user database 210 to identify for the intended recipient a format and destination for the message. For example, message processor 214 may identify from information in the user database 210 that for the intended recipient, messages are preferably forwarded for delivery as a text message to a wireless device with a particular associated number. In another example, message processor 214 may identify from information in the database that the intended recipient is to receive messages in multiple locations and in multiple formats. For example, message processor 214 may identify that the message is to be received as a text message on a particular mobile device and as an email at a particular email address. In scenarios where the intended recipient is a plurality of individuals, message processor 214 identifies at least one destination and format for each of the individuals.

At step 316, message processor 214 formats the message for communication to the intended recipient. For example, if the format that the intended recipient is to receive is an email, message processor 214 creates an email addressed to a designated email address. In an alternate scenario, a message that was originally entered as text in a Web page may be formatted as a voice rendering that is generated automatically by software from the input text. In still another scenario, if the format that the intended recipient is to receive is an instant message on a device with a particular phone number, message processor 214 formats a communication that will ultimately be directed to the phone number.

Any methodology that is suitable for formatting the message to be communicated to and received by the intended recipient may be employed. For example, in one potential embodiment, the message service 120 may rely upon a simple object access protocol (SOAP) object to communicate with services at which intended recipients are accessible. In such a scenario, at step 316, formatting a message for communication to the intended recipient may comprise formatting a SOAP envelope that contains the message text in the body of the SOAP envelope and the intended recipient in the header of the SOAP envelope. Such a scenario may be adapted to communicate numerous messages between the message service 120 and other services in a single SOAP envelope and thereby expedite and simplify the communication of messages.

In a potential embodiment, message service 120 may communicate messages via an SMS gateway. In such a scenario, at step 316, message service 120 formats messages for communication via the SMS gateway. The SMS gateway may be adapted to send a text message with or without using a mobile (cell) phone. The SMS gateway may offer SMS transit by either transforming messages to mobile network traffic from other media or by allowing transmission or receipt of SMS messages with or without the use of a mobile phone. A typical use of an SMS gateway is forwarding a simple message to a mobile phone recipient.

In a potential embodiment, message service 120 may communicate messages using a short message peer to peer (SMPP) protocol. In such a scenario, at step 316, message service 120 formats messages to be communicated using the SMPP protocol. The SMPP protocol is adapted to provide a flexible data communications interface for transfer of short message data between a message center, such as a short message service center, GSM unstructured supplementary services data (USSD) server or other type of message center and a SMS application system, such as a WAP proxy server, or other messaging gateway.

In a potential embodiment, message service 120 may format messages in order to conform to the formats required by the particular service through which intended recipients may be contacted. For example, in order to comply with the communication format of a particular mobile service provider, message processor 214 may format an electronic message such as, for example, an email, directed to a particular address of the mobile service provider. The message may be specially formatted and addressed to a particular address so that upon receipt, the mobile service forwards the contents of the message to the designated mobile device as a text message. For example, the address may comprise the phone number and an internet domain that is operated or controlled by the mobile service provider, e.g., phone_number@phoneco.com. In some scenarios, a user may have identified a particular phone number, but not designated the mobile service provider that provides service for a phone with the designated number. In such a scenario, message processor 214 may format separate messages to server domains for each of the potential service providers. Thus, message processor 214 may format messages directed to the same phone number address but at multiple different service providers "phoneco1.com;" "phoneco2.com," "phoneco3.com", etc., where phoneco1.com, phoneco2.com, and phoneco3.com are domains established by the respective mobile service carriers to receive messages, e.g., emails, the content of which are to be communicated as a text message real-time audio/video communication or pre-recorded message or other message format.

At step 318, message processor 214 communicates the message toward the intended recipient. For example, message processor 214 may communicate an email to an identified email address. In another scenario, message processor 214 may initiate a telephone call to a particular pone number where the message is to be delivered as a voice recording. Where a message is intended to be delivered as a text in a Web page, the message is formatted as text. Still further, where one or more emails have been formatted for communication to a particular mail domain of a mobile service provider designated for receiving emails that contain text for delivery as an instant message or text message, message processor 214 communicates the one or more emails. In addition to communicating the message, message processor 214 updates user database 210 and message database 212 to identify that the message has been communicated.

In the scenario mentioned above, where a mobile device number is known, but the mobile service operator is not, message processor 214 may format emails for communication to a plurality of mobile service operators. Each of the emails comprises the same known number incorporated into each of the email addresses. Of course, only one of the mobile service operators, in fact, provides service to the identified phone number. When the email arrives at that particular service operator, the message is formatted as a text message or instant message and delivered to the intended recipient. Meanwhile, the emails to those mobile service operators that do not provide service to the identified number, will not be delivered at all.

In an exemplary scenario, after a message has been communicated, the sender may wish to modify the previously sent message in some manner. For example, the sender may wish to erase, remove, overwrite, encrypt, whiteout or text color match the previously sent message. In such a scenario, receiving a message at step 310 may comprise receiving a request to modify the previously sent message. At step 312, the recipient of the previously sent message is identified. At step 314, the destination is identified as the destination of the previously stored message. For example, it is determined whether the previously sent message was delivered to a particular device or, perhaps, still located at message service 120. At step 314, message service 120 also identifies the particular modification that has been requested. For example, message service 120 determines whether it is desired to erase, remove, overwrite, encrypt, and/or whiteout or color match all or a portion of a previously sent message. At step 316, message service 120 formats a communication to the intended recipient that is consistent with the desired action. For example, the communication may comprise instructions or an indication to erase, remove, overwrite, and/or encrypt a previously communicated message. The particular format of the communication and instructions may vary depending upon the location of the previously communicated message. For example, if the previously communicated message exists within message service 120, the format of the communication may be different than if the previously communicated message was communicated to an external system such as, for example, a mobile phone system. At step 318, the message comprising instructions to modify the previously forwarded message are communicated.

Figure 4:
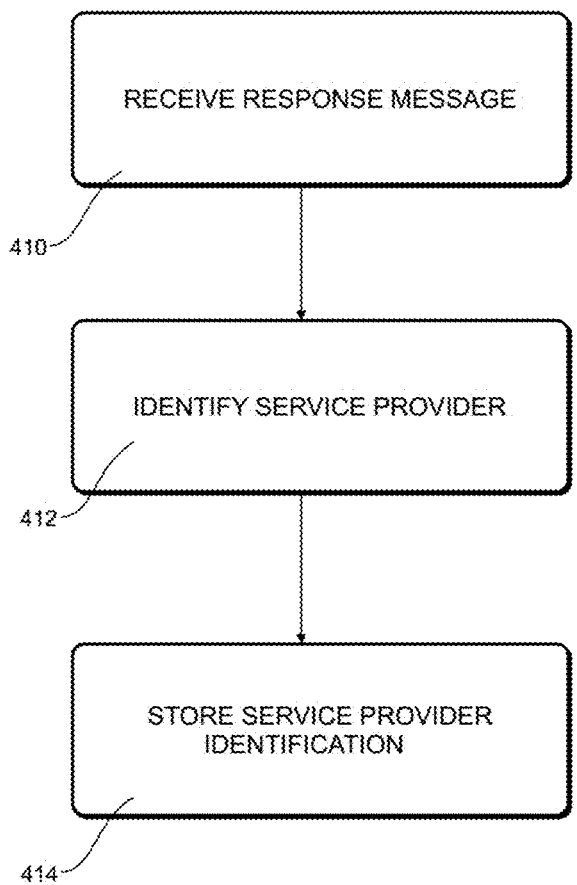
FIG. 4 is a flow diagram of an illustrative process for processing information regarding a recipient of a message.

FIG. 4 illustrates a process that may occur when a response is received from a mobile service provider where it was previously not known which service provider provided service for a particular number. At step 410, a response message is received in connection with a message that was transmitted to a plurality of different phone service providers because the exact service provider was not known. At step 412, message processor 214 identifies the mobile device number and the service provider associated with the response communication. In an exemplary scenario, message processor 214 identifies that the particular phone service provider provides the service for the number and stores information identifying the service provider as corresponding to the mobile number at step 414. Thereafter, when messages are communicated to the particular number, the message can be directed to the particular service provider.

According to another aspect of the disclosed systems and methods, the delivery of messages can be scheduled for a future date and time. In other words, all or portion of the content of the message may be prepared, the recipients identified, and a date and time in the future identified for communicating the message specified. The system monitors for the occurrence of the identified dates and time and transmits the message as specified. When a scheduled message is transmitted, the system may forward an alert to the individual that scheduled the message to notify the individual that the message has been forwarded.

Figure 5:
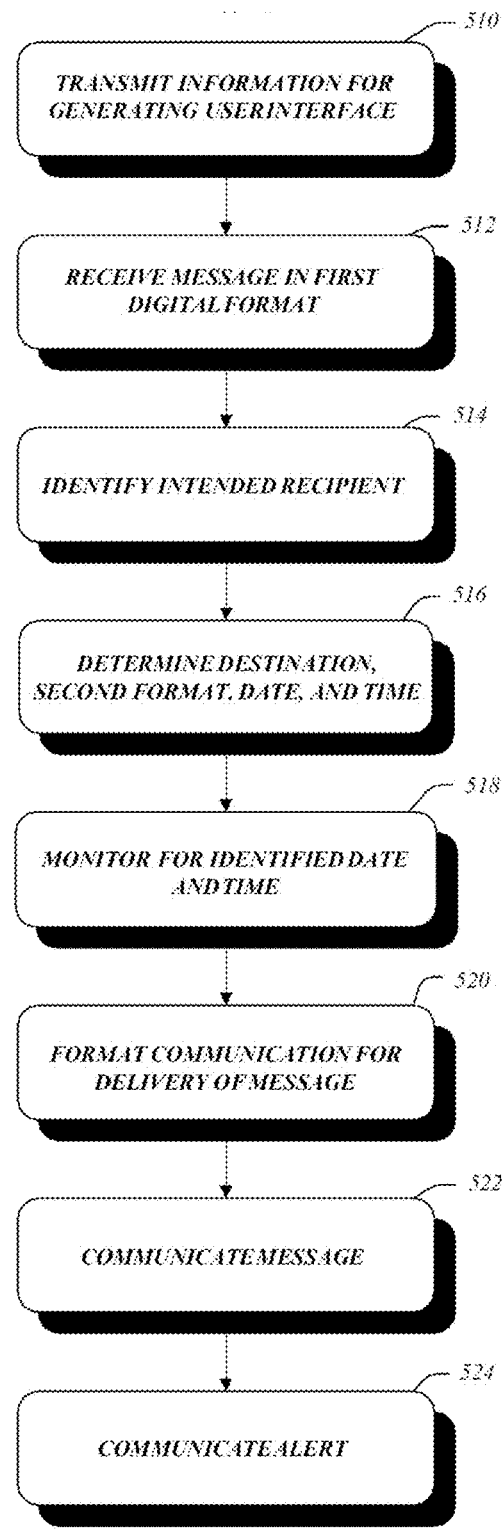
FIG. 5 is a flow diagram of an illustrative process for processing requests to communicate a message.

FIG. 5 provides a flowchart of a process for communicating messages where the communication is scheduled for a particular date and time in the future. Generally, the process for forwarding scheduled messages is similar to that described above in connection with FIG. 3, with a few exceptions. As shown in FIG. 5, in an exemplary embodiment, at step 510, user interface processor 218 cooperates with message processor 214 to create and transmit information for generating a user interface through which a user may schedule delivery of a message. Any suitable user interface may be used. In one embodiment, the user interface may be a Web interface, and at step 510, user interface processor 218 and message processor 214 transmits information for generating a web page on a client device.

Figure 6:
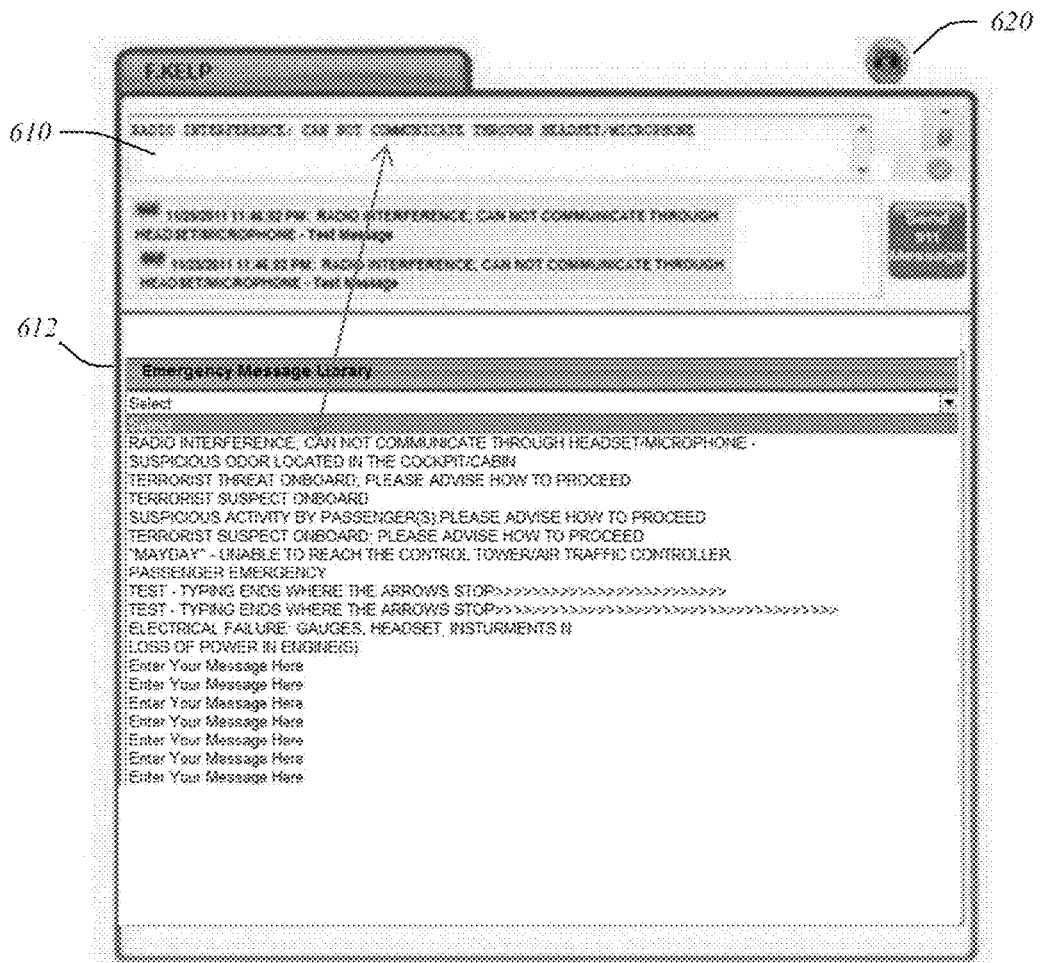
FIG. 6 depicts an illustrative user interface for entering a message.
Figure 7:
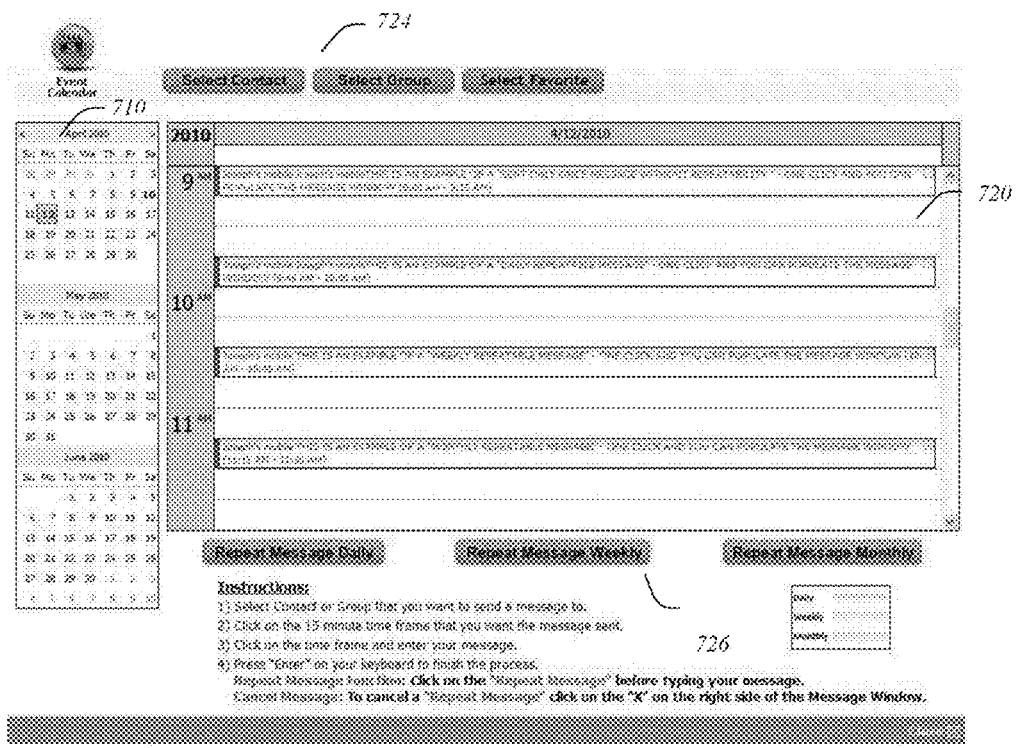
FIG. 7 depicts an illustrative user interface for scheduling a message.
Figure 8:
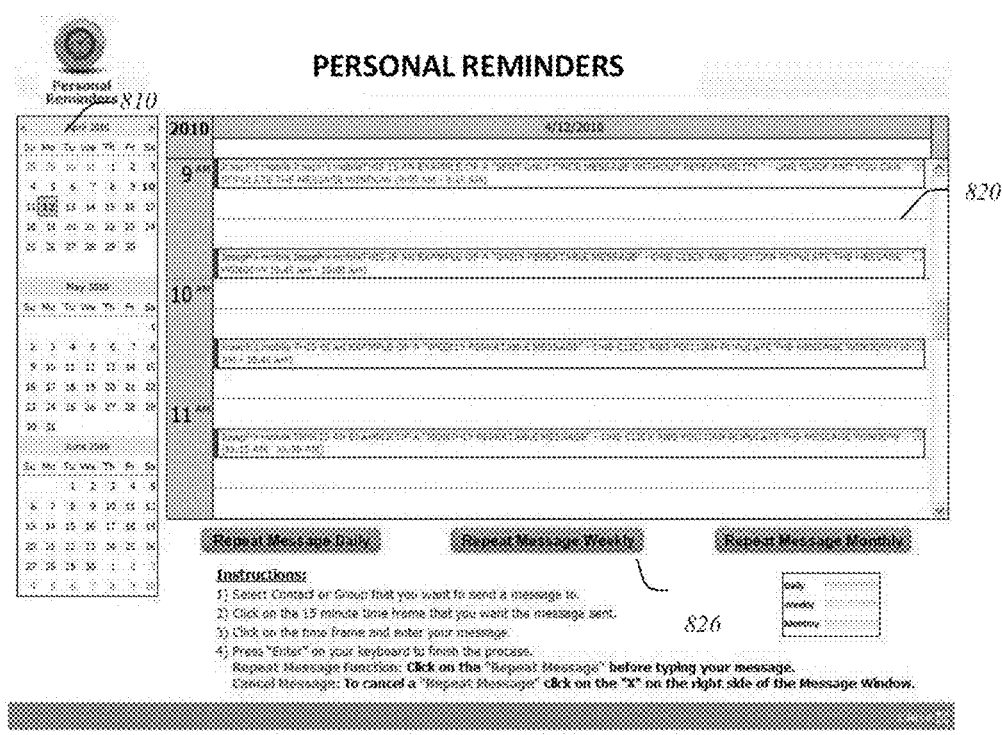
FIG. 8 depicts an illustrative user interface for scheduling a reminder message.

In one disclosed embodiment, transmitting information for generating a user interface may comprise transmitting information for creating multiple pages that are used to create messages and schedule the delivery of those messages. FIGS. 6, 7, and 8 depict illustrative user interface screens that might be created from information transmitted by user interface 218 and message processor 214. As shown in FIG. 6, a user interface screen may comprise a text input area 610 for inputting the content of the message. In the particular embodiment of FIG. 6, text libraries panels 612 contain predefined text entries that can be selected for addition to the content of the text input area 610. The content of the text libraries can be customized by the particular individual.

The user interface screen of FIG. 6 comprises a number of buttons 620 that are used to access particular functionality. In an exemplary scenario of FIG. 6, buttons 620 provide access to: an address book containing contact information for the particular user's contacts; a groups list containing a list of groups of individuals that the user has defined; a capability to send the message presently specified in text input area 610; a message event calendar; a calendar of personal reminders; an inbox of received messages; an outbox of sent messages; a repository of deleted messages; and various message related functions.

FIG. 7 depicts a user interface screen that may be generated in response to selecting button 620 corresponding to message event calendar. As illustrated, in an exemplary embodiment, a user interface may comprise a listing of monthly calendars 710 which a user may be employed to select a particular day. Once a date is selected, a listing of a schedule for the selected day is shown in panel 720. On the schedule are listed any messages that the particular user may have specified for communication on the particular day and at the designated time. The user may enter the text of the proposed message in the particular time slot that he or she wishes to schedule the communication. The operator may employ buttons 724 to add and remove persons who are to receive a scheduled message. In the particular embodiment of FIG. 7, buttons 724 may be used to: select a contact to receive a particular message that has been selected; to select a group of individuals to receive the message; and/or to select a favorite grouping of individuals and groups.

Buttons 726 may be employed by the operator of the system to specify information regarding repeating the communication of a selected message. More particularly, a user may specify an interval at which a selected message is to be repeated. For example, a user may specify that a particular message is to be communicated daily, weekly, or monthly.

FIG. 8 depicts a user interface screen that may be generated in response to selecting button 620 on FIG. 6 corresponding to personal reminders. As illustrated, in an exemplary embodiment, a user interface may comprise a listing of monthly calendars 810 which a user may be employed to select a particular day on which a reminder is to be communicated. Once a date is selected, a listing of a schedule for the selected day is shown in panel 820. On the schedule are listed any reminders that the particular user may have specified for communication on the particular day and at the designated time. The user may enter the text of the proposed message in the particular time slot that he or she wishes to schedule the communication. Buttons 826 may be employed by the operator of the system to specify information regarding repeating the communication of a reminder. More particularly, a user may specify an interval at which a selected reminder is to be repeated. For example, a user may specify that a particular reminder is to be communicated daily, weekly, or monthly.

Those skilled in the art will appreciate that user interface screens that may be communicated to a user may take many forms and shapes and still remain in the scope of perceived embodiments. Those skilled in the art will also appreciate that the data that is populated on the various interface screens and entered into the interface screens is retrieved from and stored in user database 210 and message database 212.

Referring back to FIG. 5, after step 510 wherein message processor 214 and user interface processor 218 have communicated user interface screens such as those discussed above in connection with FIGS. 6-8, one or messages that are scheduled to be communicated in the future are received at step 512. At step 514, the intended recipient of the message is identified by message processor 214. The intended recipient may be an individual identified in a contact list but may also be a distribution list of individuals. Message processor 214 identifies the information from the message and from information stored in the database.

At step 516, message processor 214 determines the destination for the message and the appropriate format as described above in connection with FIG. 3. As noted above, the format in which the message is to be received may be, and likely is, different than the format in which the message was received. At step 516, message processor 214 further determines the particular date and time that the message is meant to be communicated. This information which may be entered using interface screens such as those disclosed in connection with FIGS. 6-8. The information is stored in user and message databases 210 and 212.

At step 518, message monitor 216 portion of the message service 200 monitors for messages that are to be communicated. On the designated day and at the designated time, monitor service identifies the particular message for delivery.

At step 520, message processor 214 formats the message for communication to the intended recipient. For example, if the format that the intended recipient is to receive is an email, message processor 214 creates an email addressed to a designated email address. In an alternate scenario, a message that was originally entered as text in a Web page may be formatted as a voice rendering that is generated automatically by software from the input text. In still another scenario, if the format that the intended recipient is to receive is an instant message on a device with a particular phone number, message processor 214 formats a communication that will ultimately be directed to the number.

At step 522, message processor 214 communicates the message toward the intended recipient. For example, message processor 214 may communicate an email to an identified email address. In another scenario, message processor 214 may initiate a telephone call to a particular phone number where the message is to be delivered as a voice recording. Where a message is intended to be delivered as a text in a Web page, the message is formatted as text. Still further, where one or more emails have been formatted for communication to a particular mail domain of a mobile service provider designated for receiving emails that contain text for delivery as an instant message or text message, message processor 214 communicates the one or more emails. In addition to communicating the message, message processor 212 updates user database 210 and message database 212 to identify that the message has been communicated.

At step 524, message processor 214 communicates an alert to the user that requested to forward the message. The alert may be communicated in any manner that is suitable to apprise the sender. For example, the alert may be forwarded using a Web interface, via email, instant message, etc.

One particular set of circumstances to which the disclosed systems and methods have particular relevance is where a user is limited in the available communication choices. In particular, the system and methods may be particularly useful on board a commercial transport vehicle such as a plane with limited communication options. Federal regulations prohibit telephone use on planes during flight. This limits the ability of individuals to make telephone calls and send and receive texts on their phones. Recently, airlines have begun providing internet access during flights. With internet access to the systems and methods disclosed herein, passengers on-board airliners can prepare messages using a Web interface and have the messages delivered in other formats such as, for example, VOIP, text messages, instant messages or real-time audio/video communication or recorded message.

Thus, a passenger may be able to carry on text or audio/video instant messaging-like sessions with non-passengers during the flight using a Web interface.

The capability to communicate messages while in-transit may be particularly useful in order to address in-flight emergencies. For example, a passenger on a commercial airliner that is experiencing an emergency situation may prepare a message regarding the emergency using a Web based interface. The message may be communicated in another format, such as for example a phone call, email, sort message or 'live', real-time audio/video communication or recording, to emergency and law enforcement personnel. The passenger may communicate information about the flight, including for example, the airline, the flight number, the destination location, and the current location. The passenger may record a personalized audio and/or video message using the client device and include it in or attach it as a file to the message. The current location may be gathered by any suitable means, including, for example, by a geo-location positioning system (GPS), by triangulation techniques, or any other methodology. In a scenario wherein air-to-ground communication with the plane relies upon cell towers, the current location information communicated with a message may comprise information identifying a particular cell tower, or location of a cell tower, from which the communication originated. In a scenario wherein air-to-ground communication relies upon air-to-satellite communication, the current location information may comprise latitude and longitude information derived from the satellite positioning. The information about the emergency situation and the information regarding the flight is forwarded to the message service provider 120. The service provider 120 forwards the message to the appropriate authorities by any appropriate means. For example, the service provider 120 may communicate an email, VOIP, voice, audio and or video recording, and/or instant message to any and all of the Federal Bureau of Investigation (FBI), the Central Intelligence Agency (CIA), the Federal Aviation Authority (FAA), the Federal Emergency Management Association (FEMA), the Office of Homeland Security, and local safety and emergency response personnel. One or more of these agencies may respond to the message. The response message is received at service provider 120 and transmitted to the passenger via the Web page that was used to create the initial message.

Figure 9:
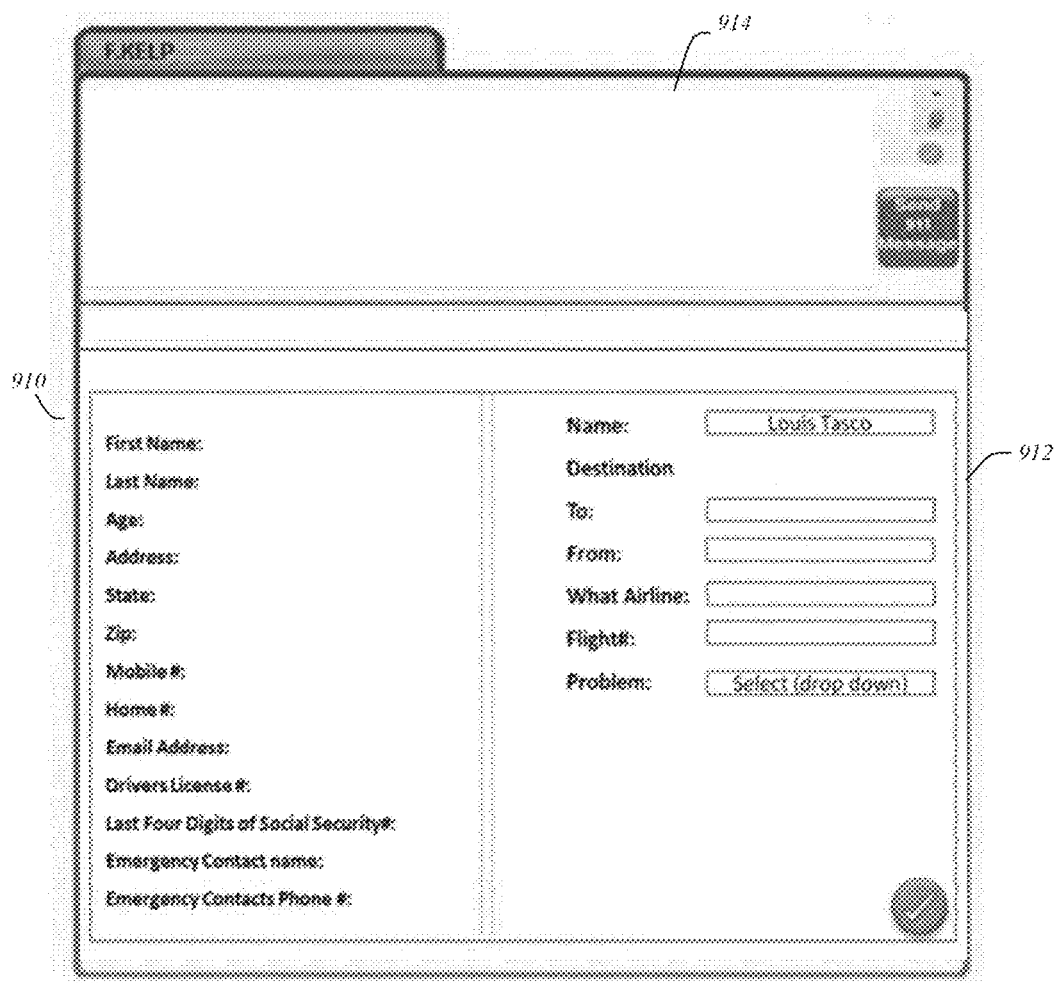
FIG. 9 depicts an illustrative user interface for entering a message regarding an emergency situation.

FIG. 9 depicts an illustrative user interface that might be used in the circumstance of the message service 120 providing notice of emergency situations. As depicted, message processor 214 may format a user interface that comprises a passenger information panel 910, a flight information panel 912, and message panel 914. Passenger information panel 910 is used to identify information about the particular user, who in this particular scenario is a passenger. The identifying information may comprise any information suitable to identify the passenger, including, for example: name; age; address; state; zip code; mobile phone number; home phone number; email address; driver's license; all or portion of a social security number; emergency contact name; and emergency contact phone number. This information may be automatically populated to the extent available in database 210.

Flight information panel 912 is used to display information about the particular flight. The information may comprise any data that would assist authorities in identifying the particular flight. In the example of FIG. 9, flight information panel 912 comprises information specifying: the destination of the flight; the origin of the flight; the airline; flight number; and a category of emergency or problem with the flight. The user may enter the information, and/or the message processor 214 and user interface processor 218 may refer to user database 210 to retrieve relevant information for populating the user interface.

Message panel 914 is used by the user to enter messages relevant to the emergency information and to review responsive messages. The user prepares the message and presses send button 916. The message history is shown at the "out" and "in" lines of the panel. In an exemplary embodiment, the message that is communicated out for a message may comprise information about the person sending the message and the flight. For example, in addition to any text of the message that was entered by the operator, the communication may also comprise one or more of the following: the sender's name; age; social security number; home address; phone number; email address; doctor's name and contact information; an emergency contact; and details regarding the flight. In one embodiment, each message that is communicated out may comprise all of the information displayed on passenger information panel 910 and flight information panel 912. It should be appreciated that the message flow to and from the user in the user interface proceeds through message service 120 and provides for formatting the messages as appropriate for the intended recipient.

According to an aspect of the disclosed embodiments, the functional components and data that are depicted in FIG. 2 and discussed throughout the present application may be accessed seamlessly from any number of applications, some of which may be specially designed for a particular market or scenario. For example, FIG. 9 discloses an illustrative user interface for accessing a messaging service during airline travel. FIGS. 6, 7, and 8 and the related discussions relate more generally to user interfaces and functionality for accessing a messaging service. It should be appreciated that the data and functionality may be shared and accessed from numerous different user interfaces. For example, a user may employ user interfaces as disclosed in 6, 7, and 8 to enter account information and contact information related to the account. But when a user is on-board an airline flight, the user might access their same contacts and account information through an entirely different website and service such as illustrated in FIG. 9. When a user deplanes from a flight and attempts to access the messaging functionality, they may automatically be directed to a user interface that is not applicable to in-flight communications. For example, the user may automatically be directed to a generic user interface or website such as described in connection with FIGS. 6 and 7. The service may recognize that the operator has deplaned by recognizing the network location from which the operator's device is accessing the service is not associated with a plane or service associated with a plane. Of course, there may be other specialized user interfaces, in addition to that described for in-flight access that may access the same central data as well.

Figure 11:
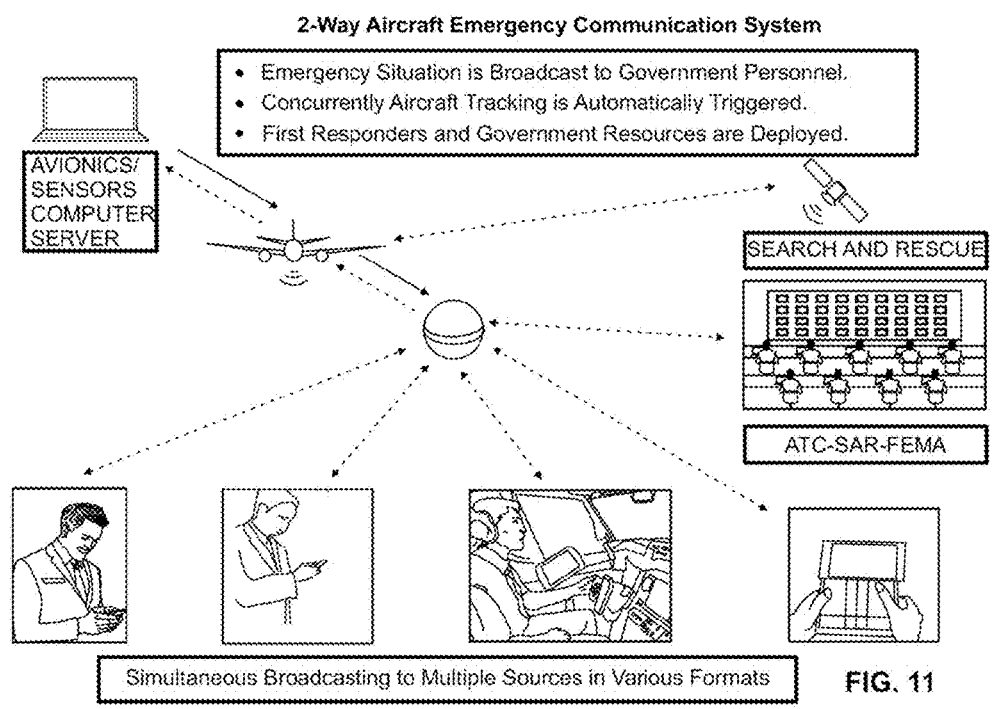

FIG. 11 illustrates an example embodiment wherein communications are provided as described above between passengers aboard an aircraft and government personnel who may be, for example, security personnel. In the embodiment of FIG. 11, messages are received at a server, where the messages may be converted into any suitable format for use at any of the numerous government platforms at which the message may be received. The server may convert a single message into multiple different formats in order to satisfy the formatting requirements of the particular recipient. The messages may be communicated simultaneously to the government personnel. In an embodiment, passengers aboard a plane or other transportation vehicle communicate via a Wi-Fi communication access point or other methodology that is provided within the vehicle. In other embodiments, communication may be provided via VHF, satellite, or other technology. Furthermore, while FIG. 11 depicts communication between passengers aboard a plane and government personnel located on the ground, embodiments of the disclosed systems and methods may provide for communications to be made from passengers on the plane to persons located on different planes or anywhere else that communication access is provided. In other words, communication may be, for example, from "plane-to-ground" or "plane-to-plane.

Figure 12:
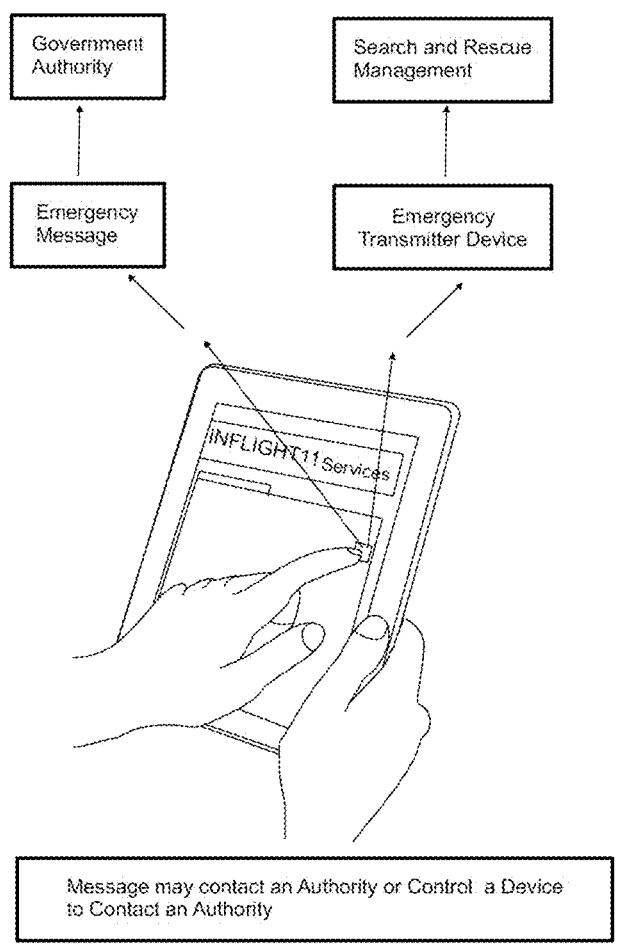

FIG. 12 illustrates another example embodiment. In the embodiment of FIG. 12, the server may pass messages between the airline passenger and the government agencies without reformatting. Rather, the end user devices, which may be, for example, computers, personal digital assistants, telephones, etc., may be programmed to perform any formatting and conversion. The formatting and conversion may be performed at the sender's device and/or at the recipients' devices.

Figure 13:
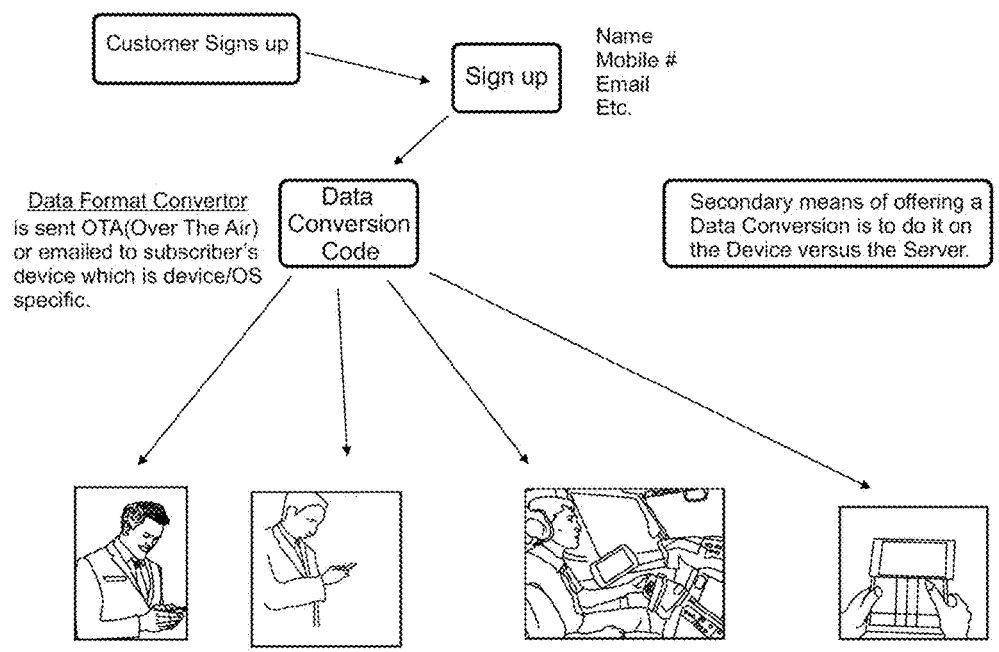

FIG. 13 illustrates a process for gathering information from individuals when they register to participate in the system. In particular, FIG. 13 illustrates that participants in the system may define at the time of registration the particular format that the customer should receive information. For example, the individual may identify the type of device that they use and the operating system that they use. This information about the individual may be stored in the system as well as on the device itself so that it may be accessed during operation.

Figure 14:
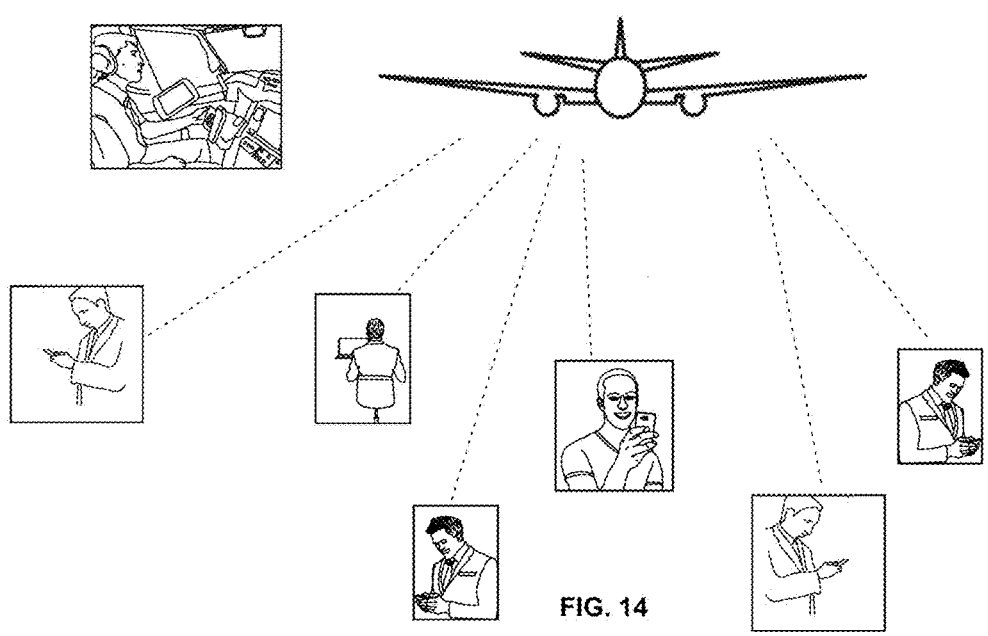

FIG. 14 illustrates multiple individuals may access and participate in real-time communications. For example numerous government personnel from various different government agencies may be simultaneously able to access and participate in communications with a passenger. In one particular embodiment, passengers can communicate with government personnel in a stand-alone mode in the event the airplane's radio system becomes inoperative.

As noted above in connection with FIG. 9, users of the system may enter information about themselves into the system which is then used by the system as needed. For example, information about the sender of the data may be communicated with each message sent by the passenger.

Figure 15:
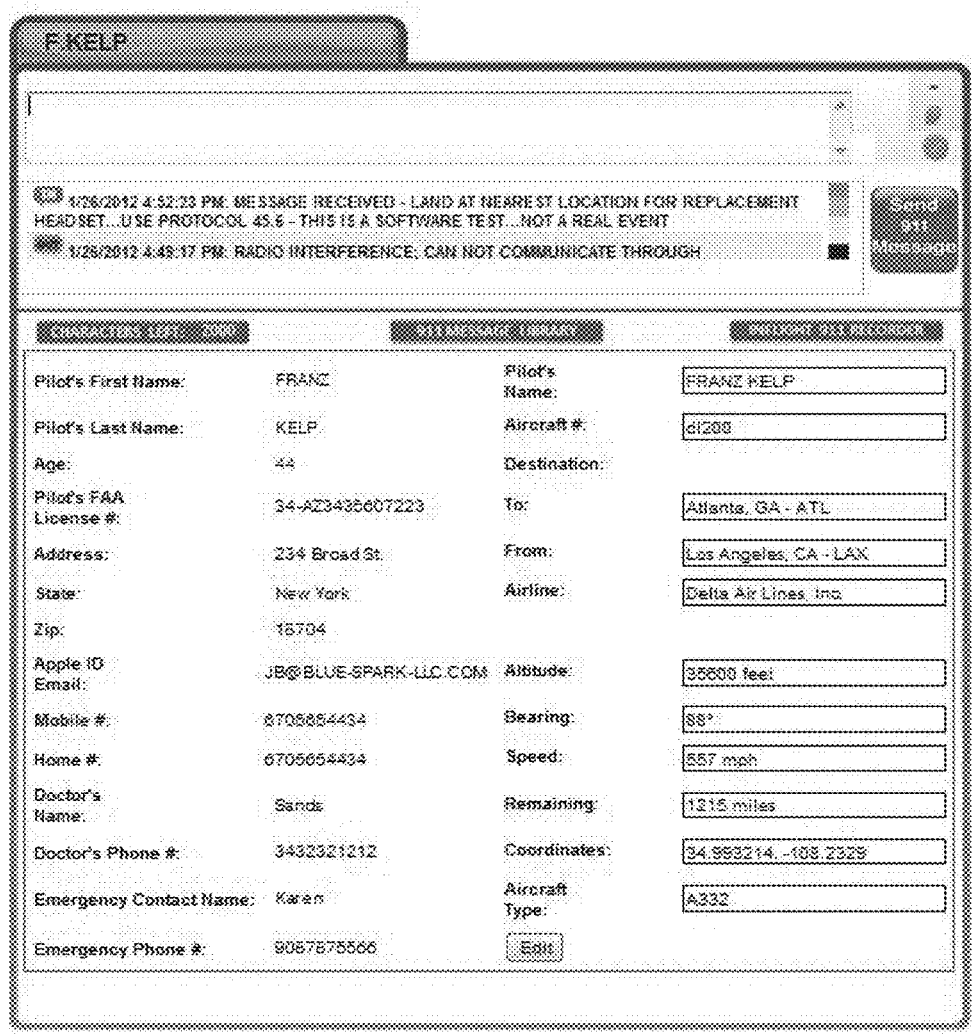

According to another embodiment, the system may be used not only by passengers, but by pilots or other personnel responsible for passengers on the plane. In such a situation, additional information about the particular pilot or other individual is entered into the system and may be embedded in messages sent by the pilot. In particular, in an embodiment for use by a pilot, the following information may be collected for and embedded with each message that is sent during the particular flight: passenger information; operator or pilot's name, age, pilot's FAA number, pilot's social security number; address; employer; emergency contact information; reported problem; identification number or transportation mode; transportation location; transportation carrier's name; photos; video; or the like. FIG. 15 illustrates a user interface that might be used to enter relevant information into the system. Such information may be stored in the system and automatically appended to any messages sent by the particular person to whom it is relevant. For example, the server may add this information to any messages originating from the particular individual.

Figure 16:
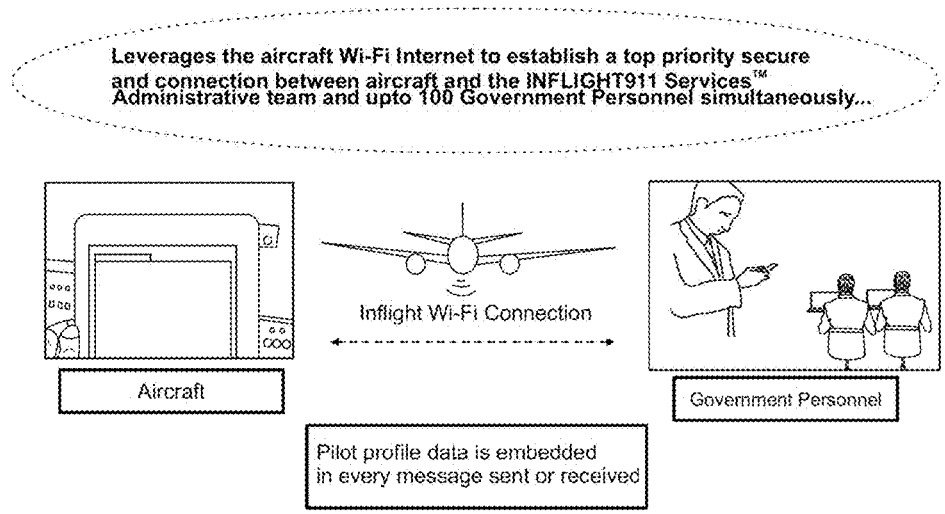

FIG. 16 illustrates an embodiment wherein an interface as described above is employed to enter a message and the messages is communicated through the system to a plurality of government personnel simultaneously. In an embodiment, the Wi-Fi internet communication channel may allow for prioritizing messages that are deemed particularly important. For example, a message relating to safety issues will received priority over messages that are being attempted but which relate to personnel or commercial issues. The priority of the messages may be set by the user employing a user interface or may be set automatically by the system.

Figure 17:
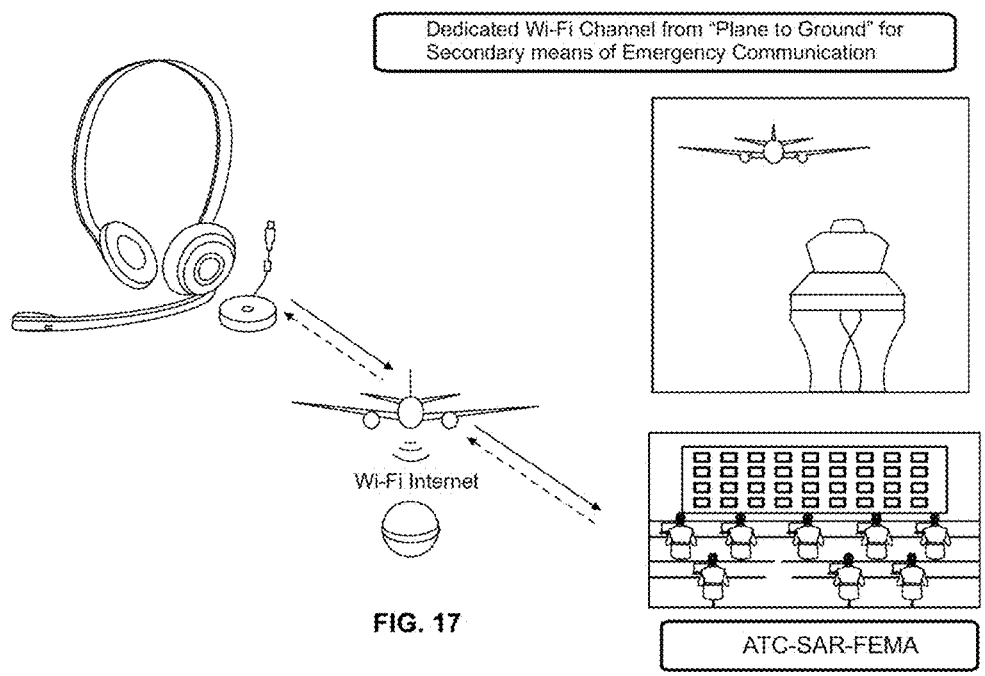

As illustrated in FIG. 17, the disclosed systems may be applied to provide a Wi-Fi enabled communication system for communicating with air traffic personnel. This Wi-Fi enabled communication channel may be used as a primary communication means or as a backup to existing systems. A Wi-Fi enabled system such as described in here may be used to communicate speech, text, and/or video. Such information can be instantly recorded providing for a live "black box." As noted above, the information may be communicated simultaneously to multiple individuals and/or agencies in order to minimize the risk of human oversight.

Figure 18:
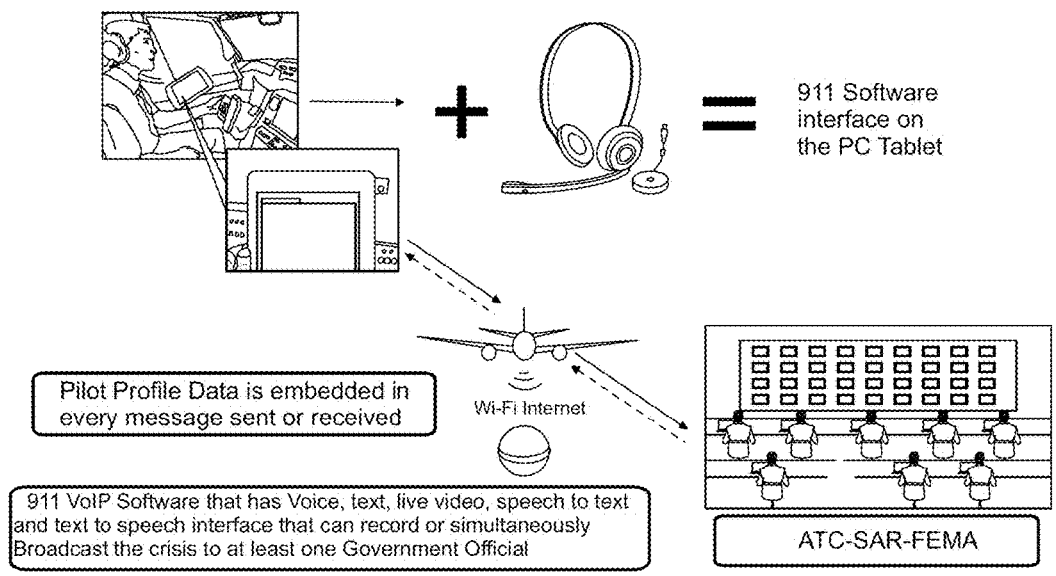

FIG. 18 illustrates that the voice, text, video, and any conversions between format types may be recorded and simultaneously broadcast to as many individuals, including government employees, as is necessary. Such an embodiment is particularly suited for those that are used by pilots in the cockpit of the airplane. For example, in a particular embodiment, a pilot may access the system using a device such as a tablet computing device that is mounted in the airplane cabinet along with other communication devices.

Figure 19:
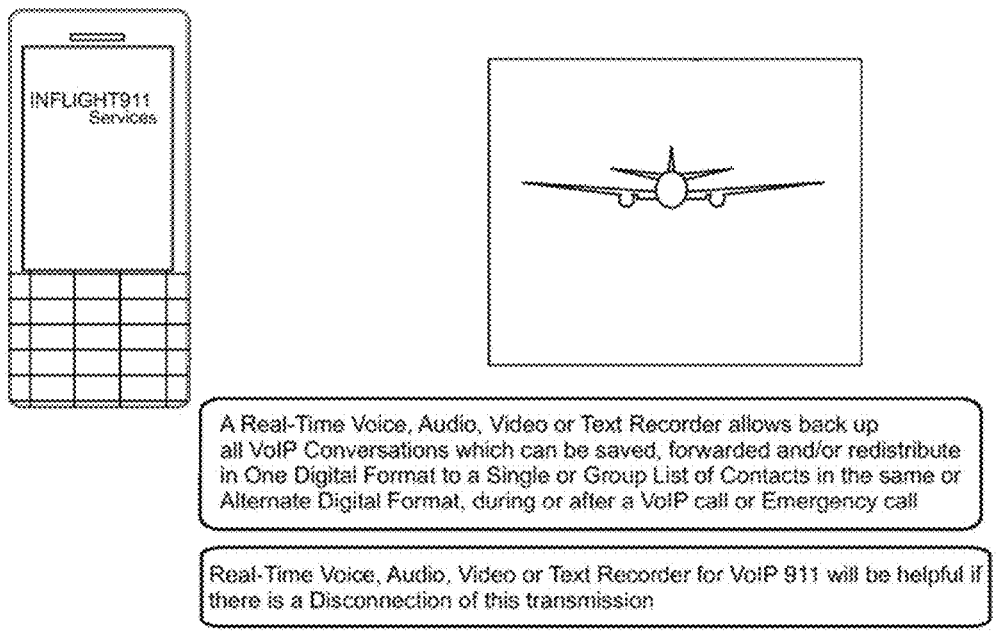

FIG. 19 illustrates an embodiment wherein communications made using the system are recorded, regardless of the format of the communication. The ability to record messages may find use in any of numerous situations, including where an interruption takes place during communication. Information that was not communicated due to the interrupt is not lost and may be communicated when the communication link is reestablished using the recorded information.

Figure 20:
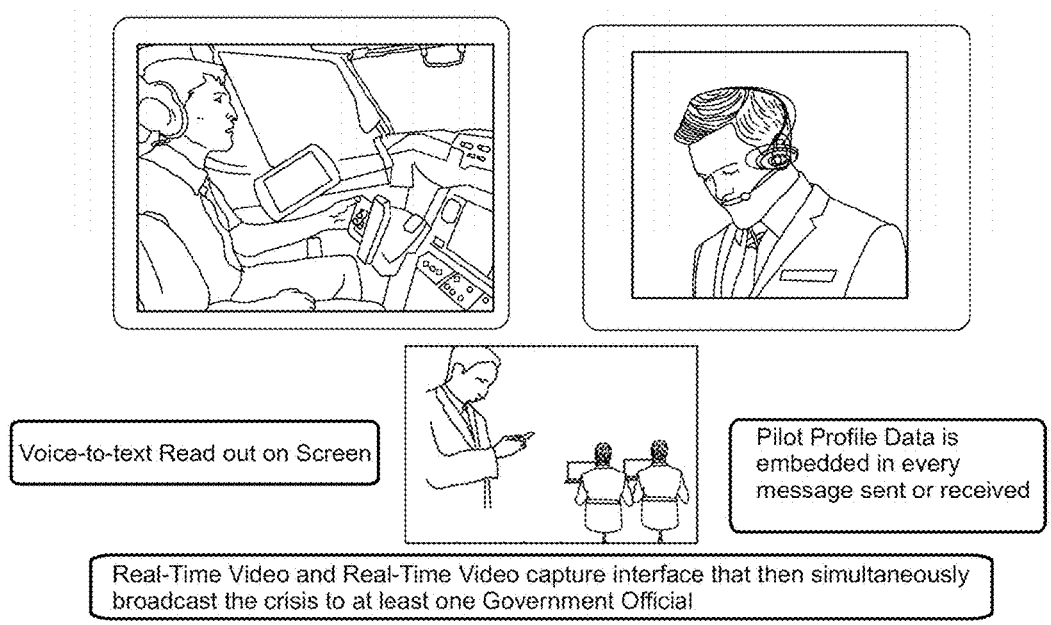

FIG. 20 illustrates an embodiment wherein message input maybe taken by any of numerous different format including voice real-time audio/video communication or recording. The voice input may be formatted as necessary by the system for use by the appropriate recipients. The format for an individual may be determined by referring to the information about the individual when registered in the system. For example, for individuals whose profiles indicate they receive messages using text, the voice input may be converted to text prior to receipt by the individual. For other individuals whose profiles indicate they are may receive voice communications, the voice message from the pilot is received as such.

An embodiment of the presently disclosed systems and methods may provide for conversion between languages so as to avoid confusion in communications between pilots and air traffic controllers. With international flight, there may be a language barrier between pilots and controllers. The presently disclosed system may operate as an equalizer by translating messages between the two. This feature offers to eliminate confusion that otherwise could occur.

Figure 22:
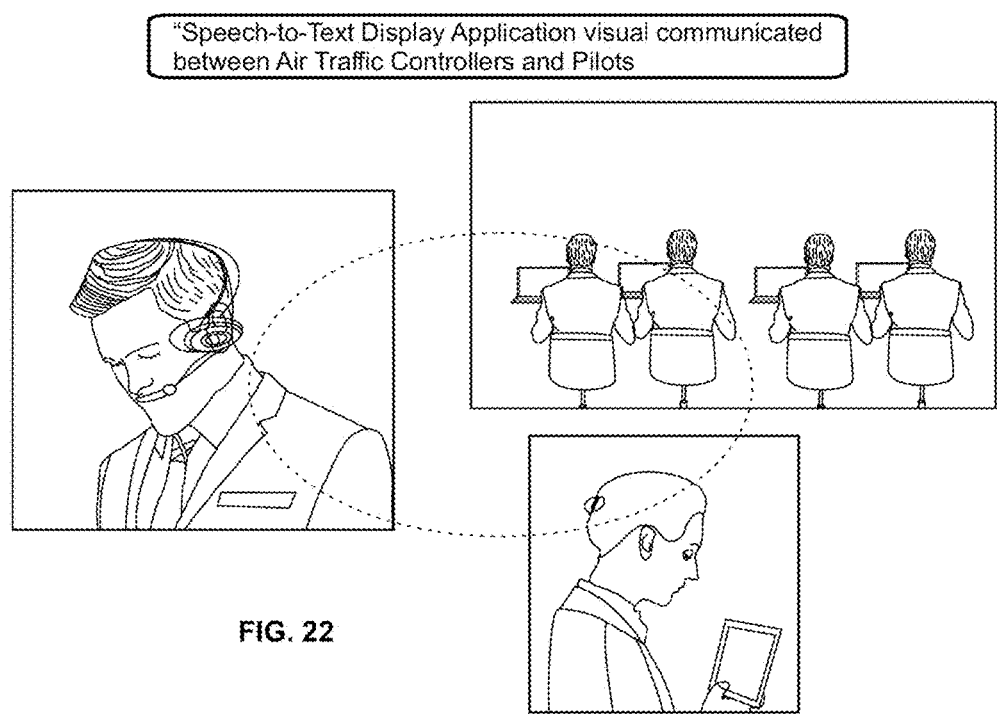

FIG. 22 illustrates an embodiment wherein speech to text is employed. As shown, speech input by a pilot or air traffic controller may be converted by the system to text which may be displayed by the system when the message is communicated to the intended recipient of the message.

According to other potential embodiments, barcode inputs may be used to enter inputs into the system. Thus, information about a flight, a pilot, a passenger, or any other type of person or thing may be stored in barcode format. As illustrated in FIG. 23, a barcode reader may be used to read the information and enter the information into the system. In alternate embodiments, other inputs, such as biometric identification systems, may be used to gather and enter information into the system.

Figure 24:
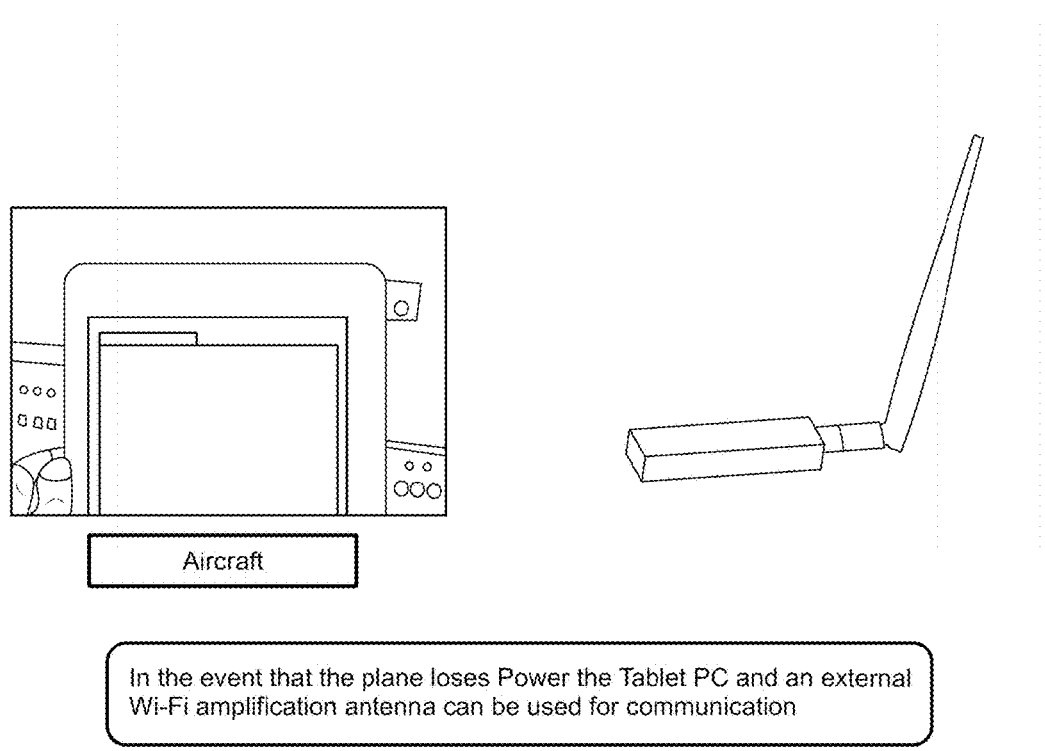

FIG. 24 illustrates that in an embodiment, a Wi-Fi enabled antenna or other methodology may be employed with individual devices to communicate with ground bases. Such an embodiment may be used, for example, in circumstances wherein the plane's Wi-Fi or similar methodology becomes inoperative.

FIG. 25 illustrates an example message that may be received using systems and methods as disclosed herein. As illustrated, the message contains information about the passenger that sent the message and the flight that the passenger is on. In the particular example of FIG. 25, the sender's information indicates that the message was sent by a pilot and includes information about the pilot.

Figure 26:
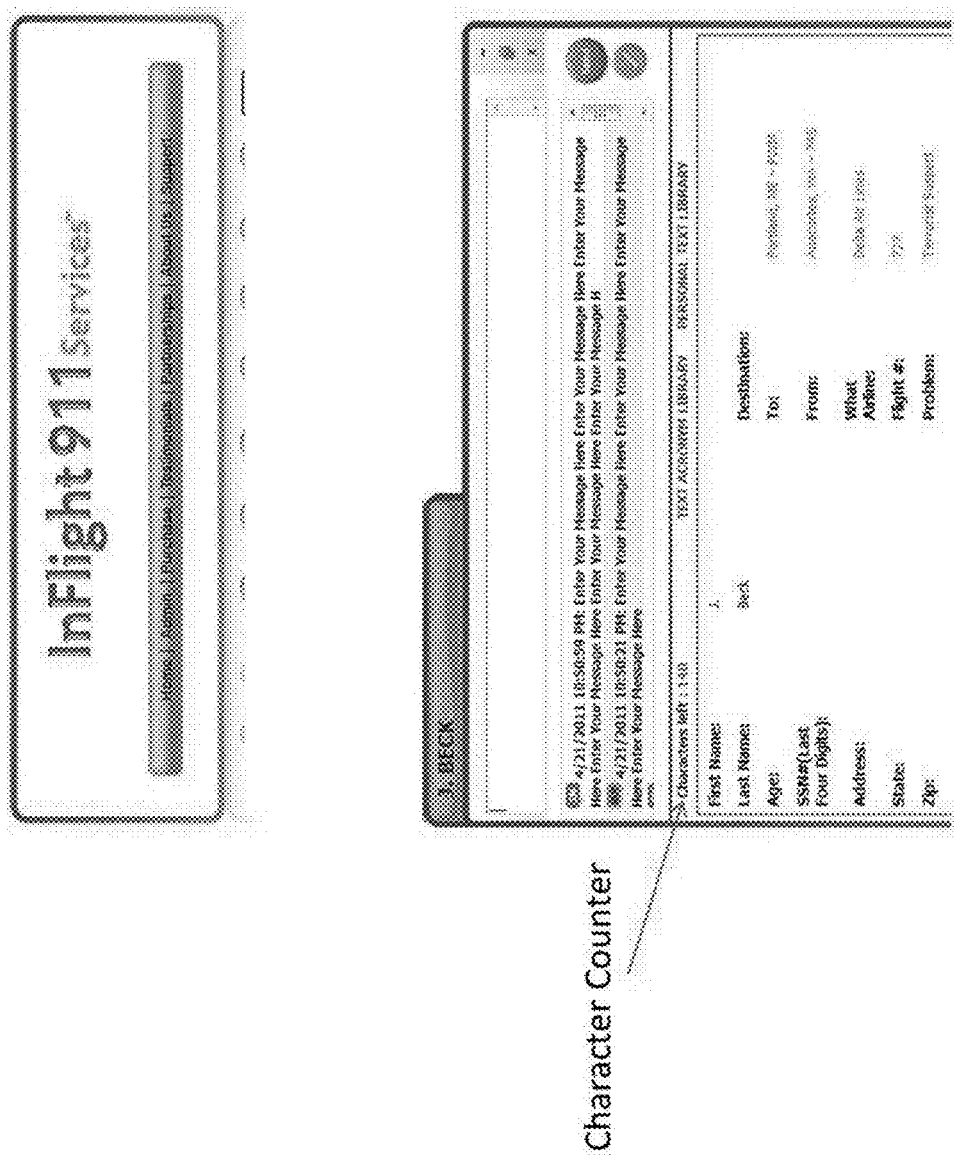

FIG. 26 illustrates an example user interface that might be used to enter message text. As shown, identifying information about the sender is listed in the bottom of the screen and the message text is listed at the top of the screen. In the particular example of FIG. 26, the sender is a pilot and includes information about the pilot and the flight. Information about the pilot and the flight is embedded in messages as illustrated in FIG. 25.

Figure 27:
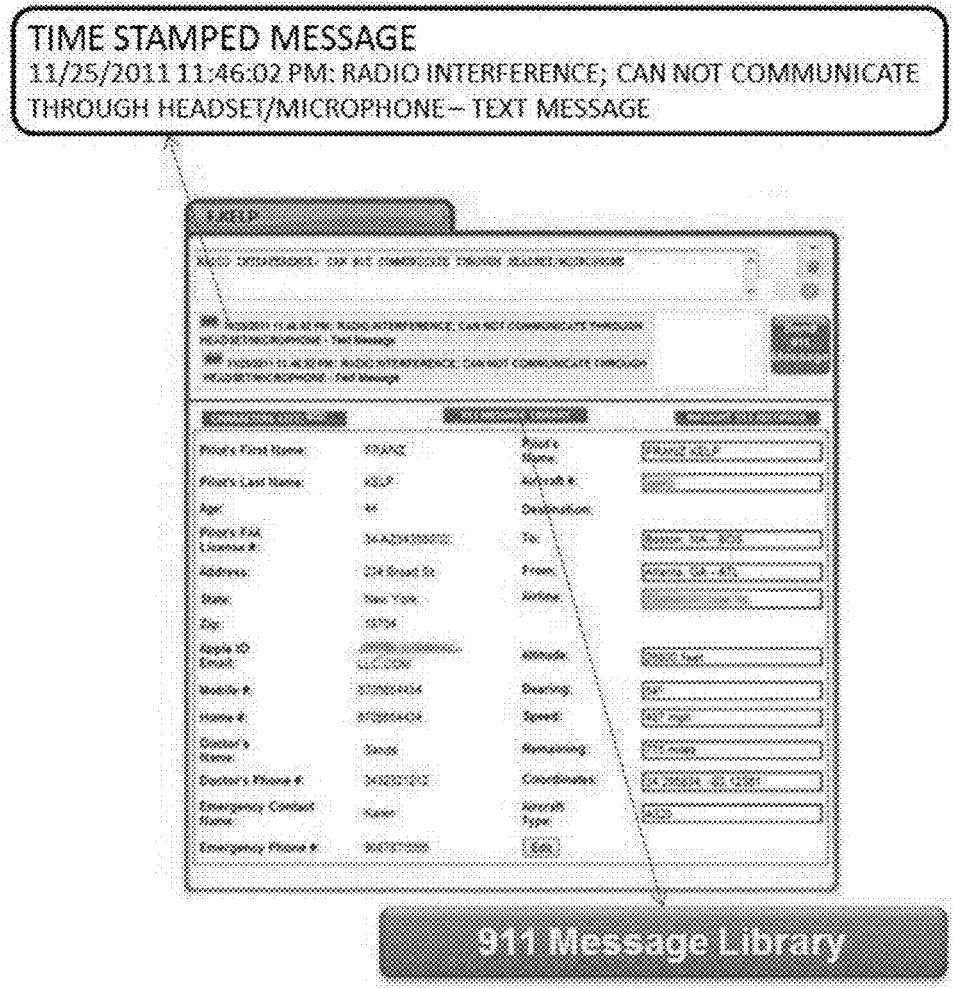

FIG. 27 illustrates an example user interface for sending and receiving messages. As shown, messages that have been sent are listed along with the date and time that the message was sent. Also, libraries of text inputs may be available to users to facilitate the creation of messages.

FIG. 28 illustrates an example message that may be sent using the disclosed systems and methods. In particular, a message such as illustrated may be prepared and communicated simultaneously to a plurality of individuals including those that may represent the government in various capacities .ADD COPS-SARSAT.

According to an aspect of the disclosed embodiments, messages that are prepared and communicated may be recorded. The recorded message may be in a format other than that in which the message was initially created. The recorded message may be communicated for any number of reasons including, for example, if there is a question as to whether the initial message was communicated and/or received.

Example Computing Environment

Figure 10:
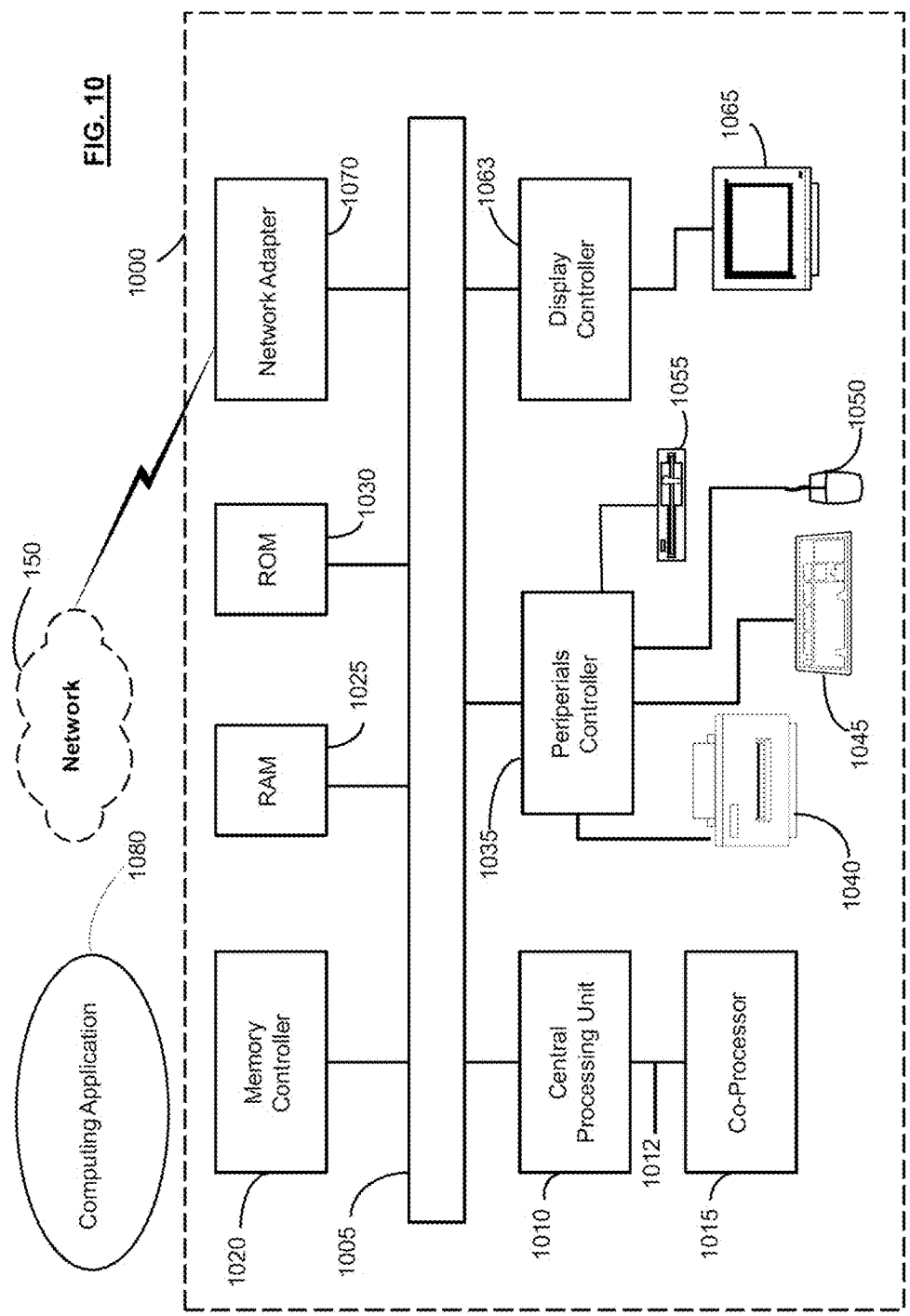
FIG. 10 is a block diagram of a computing environment with which aspects of the subject matter described herein may be deployed.

FIG. 10 depicts a block diagram of an exemplary computing system 1000 that may be used to implement the systems and methods described herein. For example, the computing system 1000 may be used to implement the message service 120 as well as any of devices 110a-e. The computing system 1000 may be controlled primarily by computer readable instructions that may be in the form of software. The computer readable instructions may include instructions for the computing system 1000 for storing and accessing computer readable instructions themselves. Such software may be executed within a central processing unit (CPU) 1010 to cause the computing system 1000 to perform the processes or functions associated therewith. In many known computer servers, workstations, personal computers, or the like, the CPU 1010 may be implemented by microelectronic chips CPUs called microprocessors.

In operation, the CPU 1010 may fetch, decode, and/or execute instructions and may transfer information to and from other resources via a main data-transfer path or a system bus 1005. Such a system bus may connect the components in the computing system 1000 and may define the medium for data exchange. The computing system 1000 may further include memory devices coupled to the system bus 1005. According to an example embodiment, the memory devices may include a random access memory (RAM) 1025 and read only memory (ROM) 1030. The RAM 1025 and ROM 1030 may include circuitry that allows information to be stored and retrieved. In one embodiment, the ROM 1030 may include stored data that cannot be modified. Additionally, data stored in the RAM 1025 typically may be read or changed by CPU 1010 or other hardware devices. Access to the RAM 1025 and/or ROM 1030 may be controlled by a memory controller 1020. The memory controller 1020 may provide an address translation function that translates virtual addresses into physical addresses as instructions are executed.

In addition, the computing system 1000 may include a peripherals controller 1035 that may be responsible for communicating instructions from the CPU 1010 to peripherals, such as, a printer 1040, a keyboard 1045, a mouse 1050, and data a storage drive 1055. The computing system 1000 may further include a display 1065 that may be controlled by a display controller 1063. The display 1065 may be used to display visual output generated by the computing system 1000. Such visual output may include text, graphics, animated graphics, video, or the like. The display controller 1063 may include electronic components that generate a video signal that may be sent to the display 1065. Further, the computing system 1000 may include a network adaptor 1070 that may be used to connect the computing system 2000 to an external communication network such as the network 150, described above in FIG. 1.

Thus, applicants have disclosed exemplary embodiments of systems and methods for performing message processing. Messages are received, formatted for receipt in a different format, and communicated for receipt by the intended recipient. It will be appreciated that while illustrative embodiments have been disclosed, the scope of potential embodiments is not limited to those explicitly set out. For example, while the system has been described with reference to systems and methods for email, Web, digital voice, and instant message processing, the envisioned embodiments extend beyond processing of any particular type of message format. Similarly, any type of device such as, for example, a laptop computer, PDA, mobile phone, etc. may be used to send or receive messages.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method suitable for communicating emergency information from a user emergency location, said method comprising the steps of:
    continuously monitoring user location data at a removable autonomous survival emergency location transmitter activation device, the user location data including at least one of software, text content, speech, voice, audio, video information, control signal, time, tracking signal, transmitter signal, Global Navigation Satellite System (GNSS) position coordinates, and geo-location data;
    providing a user-accessible removable autonomous survival emergency location transmitter (ELT);
    when determined by said removable autonomous survival emergency location transmitter activation device that at least one of an emergency or a technical problem is identified in monitored user location data;
    processing said monitored user location data into a computer readable instruction; and
    using said computer readable instruction to automatically activate and control said removable autonomous survival emergency location transmitter, said removable autonomous survival emergency location transmitter functioning to automatically trigger real-time tracking of said removable autonomous survival emergency location transmitter via satellite;
    wherein monitored user location data for said real-time tracking includes at least one of software, text content, speech, voice, audio, video information, control signal, time, tracking signal, tracking signal, transmitter signal, Global Navigation Satellite System position coordinates, and geo-location data;
    wherein the removable autonomous survival emergency location transmitter conforms to removable autonomous survival emergency location transmitter standards defined by the International Civil Aviation Organization (ICAO) in functioning to broadcast distinctive signals on designated frequencies, and wherein said removable autonomous survival emergency location transmitter is normally manually activated; and
    wherein said removable autonomous survival emergency location transmitter activation device includes a processor configured to monitor and process data, and to automatically activate and control said removable autonomous survival emergency location transmitter when said emergency or technical problem is identified.

2. The computer-implemented method of claim 1, further comprising the step of initiating tracking of said removable autonomous survival emergency location transmitter by at least one government authority in response to said step of using said computer readable instruction to automatically activate and control said removable autonomous survival emergency location transmitter.

3. The computer-implemented method of claim 1, further comprising the step of enabling remote control of said removable autonomous survival emergency location transmitter by a ground-based emergency service authority in response to said step of using said computer readable instruction to automatically activate and control said removable autonomous survival emergency location transmitter.

4. The computer-implemented method of claim 1, wherein said autonomous survival emergency location transmitter conforms to emergency beacon used to transmit distress signals as defined by the National Oceanic and Atmospheric Administration (NOAA), the defined emergency beacon functioning to broadcast distinctive signals on designated frequencies.

5. The computer-implemented method of claim 1 further comprising the steps of initiating at least one of: an alarm, location indicator light or horn signal on said removable autonomous survival emergency location transmitter in response to said step of using said computer readable instruction to automatically activate and control said removable autonomous survival emergency location transmitter.

6. The computer-implemented method of claim 1, wherein said computer readable instruction comprises information about at least one of: real-time tracking of the removable autonomous survival emergency location transmitter by Global Navigation Satellite System (GNSS) position coordinates, real-time tracking of the removable autonomous survival emergency location transmitter outgoing tracking signal, Global Navigation Satellite System position coordinates included in the removable autonomous survival emergency location transmitter outgoing tracking signal, geo-location information for the removable autonomous survival emergency location transmitter, a removable autonomous survival emergency location transmitter position obtained by a distress beacon signal, triangulation, and communication satellite information for the location of said removable autonomous survival emergency location transmitter.

7. The computer-implemented method of claim 1, further comprising the step of remotely accessing said monitored user location data by at least one government authority in response to said step of using said computer readable instruction to automatically activate and control said removable autonomous survival emergency location transmitter.

8. The computer-implemented method of claim 1, further comprising the step of remotely controlling said removable autonomous survival emergency location transmitter by at least one ground-based government authority in response to automatically activating and controlling said removable autonomous survival emergency location transmitter activation device to trigger said removable autonomous survival emergency location transmitter.

9. A computer-implemented method suitable for automatically responding to an emergency situation detected at a user location, said method comprising the steps of:
   continuously monitoring user location data with a removable autonomous survival emergency location transmitter activation device for an indication that the emergency situation has been detected;
   providing a user-accessible removable autonomous survival emergency location transmitter (ELT) configured to provide an outgoing tracking signal;
   if the emergency situation is detected, processing monitored user location data into a computer readable instruction; and
   executing said computer readable instruction by said removable autonomous survival emergency location transmitter activation device to automatically activate said removable autonomous survival emergency location transmitter so as to automatically trigger tracking of the aircraft accident location and establish a remote interface between said removable autonomous survival emergency location transmitter activation device and said removable autonomous survival emergency location transmitter;
   wherein said removable autonomous survival emergency location transmitter conforms to removable autonomous survival emergency location transmitter standards defined by the International Civil Aviation Organization (ICAO) in functioning to broadcast distinctive signals on designated frequencies, and wherein said removable autonomous survival emergency location transmitter is normally manually activated; and
   wherein said removable autonomous survival emergency location transmitter activation device includes a processor configured to monitor and process data, and to automatically include Global Navigation Satellite System (GNSS) position coordinates in said outgoing tracking signal.

10. The computer-implemented method of claim 9 further comprising the steps of:
   automatically generating at least one of an aural notification of the emergency situation and a visual notification of the emergency situation; and
   sending said at least one of said aural notification and said visual notification to ground-based government authority via an air-to-ground communication connection.

11. The computer-implemented method of claim 9, further comprising the step of notifying at least one ground-based government authority of activation of said removable autonomous survival emergency location transmitter.

12. The computer-implemented method of claim 11 wherein said at least one ground-based government authority comprises one or more of: the Federal Bureau of Investigation (FBI), the Central Intelligence Agency (CIA), International Maritime Organization (IMO), the Federal Aviation Authority (FAA), the Federal Emergency Management Association (FEMA), the Office of Homeland Security, and a safety and emergency response team.

13. The computer-implemented method of claim 9, further comprising the steps of:
   in response to said step of executing said computer readable instruction to automatically activate said removable autonomous survival emergency location transmitter, sending an emergency message to at least one ground-based government authority via a satellite-to-ground communication connection; said emergency message including real-time Global Navigation Satellite System (GNSS) position coordinates; and sending at least one of
   a real-time emergency signal to ground-based personnel to determine the location of the removable autonomous survival emergency location transmitter using said Global Navigation Satellite System position coordinates and
   a real-time emergency signal to said ground-based personnel to enable real-time tracking of said removable autonomous survival emergency location transmitter using said Global Navigation Satellite System position coordinates.

14. The computer-implemented method of claim 9 wherein said autonomous survival emergency location transmitter activation device remotely controls a location signal light independently of said removable autonomous survival emergency location transmitter when said removable autonomous survival emergency location transmitter is activated.

15. The computer-implemented method of claim 9 wherein user location data from a programmable attitude sensor device functions to activate said removable autonomous survival emergency location transmitter.

16. The computer-implemented method of claim 9 wherein said monitored user location data comprises data obtained from at least one of a user location, an aircraft, a seaplane, or a marine vessel and includes at least one of an alarm, a transmitter, a radar system, an automatic broadcasting surveillance system, a data recorder, a data acquisition unit, an attitude sensor, a differential pressure sensor, an analog sensor, a temperature sensor, an instability sensor, an emergency frequency sensor, a proximity sensor, and a transponder on board said aircraft, said seaplane, or said marine vessel.

17. The computer-implemented method of claim 9 further comprising the step of recording, either internally or remotely, removable autonomous survival emergency location transmitter communication, information, data, and content for transmittal to a ground-based computer database over an air-to-ground communication connection.

18. The computer-implemented method of claim 9 further comprising the step of establishing an air-to-ground communication connection using one or more of: a control signal, a data command, text content, an e mail, voice, a real-time audio/video communication, a real-time audio/video recording, and an instant message.

19. The computer-implemented method of claim 9 wherein said emergency situation comprises one or more of: a change in attitude greater than a specified amount; a change in altitude greater than a specified amount; a change in speed greater than a specified amount; a change in cabin pressure greater than a specified amount, a change in location greater than a specified distance; a change in a flight plan greater than a specified amount, a change in a transit plan greater than a specified amount, a change in destination location, and a variance in tracking information greater than a specified value.

20. The computer-implemented method of claim 9 wherein said emergency location transmitter conforms to emergency beacons used to transmit distress signals as defined by the National Oceanic and Atmospheric Administration (NOAA), the defined emergency beacon functioning to broadcast distinctive signals on designated frequencies.

21. A removable autonomous survival emergency location transmitter tracking system suitable for use at a user emergency location, said system comprising:
    a removable autonomous survival emergency location transmitter activation device functioning to obtain monitored emergency location data;
    a user-accessible removable autonomous survival emergency location transmitter activation device having a user interface configured to provide access to modify, monitor and control of said removable autonomous survival emergency location transmitter activation device, said removable autonomous survival emergency location transmitter activation device further configured to provide access to monitor said monitored emergency location data for identification of a possible emergency or technical problem; and
    wherein said removable autonomous survival emergency location transmitter activation device further functions to obtain a determination of at least one of said emergency or technical problem, said removable autonomous survival emergency location transmitter activation device further functioning to process said emergency location data into a computer readable instruction; such that said removable autonomous survival emergency location transmitter activation device automatically activates a removable autonomous survival emergency location transmitter (ELT) to continuously communicate with a satellite tracking system and to track and report geo-location of said removable autonomous survival emergency location transmitter in specified and designated time intervals in response to said determination of at least one of said emergency or technical problem, via said computer readable instruction;
    wherein said removable autonomous survival emergency location transmitter conforms to removable autonomous survival emergency location transmitter standards defined by the International Civil Aviation Organization (ICAO) in functioning to broadcast distinctive signals on designated frequencies, and wherein said removable autonomous survival emergency location transmitter is normally manually activated; and
    wherein said removable autonomous survival emergency location transmitter activation device includes a processor configured to monitor and process said emergency location data, and to automatically activate and control said removable autonomous survival emergency location transmitter when said at least one of said emergency or technical problem is identified.

22. The removable autonomous survival emergency location transmitter tracking system of claim 21 wherein said user interface comprises hardware and software to enable at least one of local access or remote access to at least one of said removable autonomous survival emergency location transmitter activation device and said removable autonomous survival emergency location transmitter.

23. The removable autonomous survival emergency location transmitter tracking system of claim 21 wherein said removable autonomous survival emergency location transmitter activation device functions; in response to said identification of a possible emergency or technical problem, to activate said removable autonomous survival emergency location transmitter to transmit, via said satellite tracking system, said monitored emergency location data sent for said real-time tracking, said monitored emergency location data including at least one of software, text content, speech, voice, audio, video information, control signal, time, tracking signal, transmitter signal, Global Navigation Satellite System (GNSS) position coordinates, and geo-location data.

24. The removable autonomous survival emergency location transmitter tracking system of claim 21 wherein said removable autonomous survival emergency location transmitter confirms to emergency beacons used to transmit distress signals as defined by the National Oceanic and Atmospheric Administration (NOAA) and International Civil Aviation Organization (ICAO), the defined emergency location transmitter functioning to broadcast distinctive signals on designated frequencies, wherein said distress signals and emergency location transmissions include Global Navigation Satellite System (GNSS) position coordinates included in an outgoing tracking signal.

25. The removable autonomous survival emergency location transmitter tracking system of claim 21 wherein said removable autonomous survival emergency location transmitter activation device comprises a digital programmable passenger personal telemetry sensor device, said programmable passenger personal telemetry sensor device functioning to activate said removable autonomous survival emergency location transmitter to communicate with said satellite tracking system in response to said identification of said possible technical problem or emergency.

26. The removable autonomous survival emergency location transmitter tracking system of claim 21 wherein said removable autonomous survival emergency location transmitter is configured for at least one of: manual activation, manual deactivation, automatic activation, automatic deactivation, activation by remote control, and deactivation by remote control.

27. The removable autonomous survival emergency location transmitter tracking system of claim 21 wherein said automatic activation of said removable autonomous survival emergency location transmitter is initiated on an amphibious aircraft, a seaplane, or a marine vessel by at least one of: an alarm, a transmitter, a radar system, an automatic broadcasting surveillance system, a pressurization system, an engine indicating and crew alerting system, a data recorder, a data acquisition unit, an attitude sensor, a differential pressure sensor, an analog sensor, a temperature sensor, an instability sensor, an emergency frequency sensor, a proximity sensor, transponder, an amphibious aircraft gauge, a seaplane gauge, and a marine vessel gauge.

28. The removable autonomous survival emergency location transmitter tracking system of claim 21 wherein said removable autonomous survival emergency location transmitter responds to activation by remote control and to deactivation by remote control initiated by at least one of a ground station or air traffic control via at least one of a web interface or a satellite communication system.

29. The removable autonomous survival emergency location transmitter tracking system of claim 21 wherein said activation by said removable autonomous survival emergency location transmitter activation device comprises activation in response to at least one of: passenger position indicating beacon, a lost passenger, a passenger personal telemetry signal, a passenger parachute deployment, a passenger raft, a passenger seat, a passenger vest, a passenger vessel emergency or technical problem, a vehicle roll-over, a vehicle attitude change, and a variance in removable autonomous survival emergency location transmitter activation device tracking information different from a specified value.

30. A method suitable for communicating emergency information from a user emergency location, said method comprising:
  continuously receiving user location data at a removable autonomous survival emergency location transmitter activation device;
  automatically monitoring user location data information obtained from said received aircraft data, said monitored aircraft data for said real-time tracking including at least one of software, text content, speech, voice, audio, video information, control signal, time, tracking signal, transmitter signal, Global Navigation Satellite System (GNSS) position coordinates, and geo-location data;
  when determined from said monitored user location data that an emergency or technical problem is identified, triggering said removable autonomous survival emergency location transmitter activation device to automatically initiate real-time tracking of the removable autonomous survival emergency location transmitter via satellite by activating a removable autonomous survival emergency location transmitter (ELT);
  wherein said removable autonomous survival emergency location transmitter conforms to emergency beacons used to transmit distress signals as defined by the National Oceanic and Atmospheric Administration (NOAA) and International Civil Aviation Organization (ICAO), the defined emergency location transmitter functioning to broadcast distinctive signals on designated frequencies, and
  wherein said removable autonomous survival emergency location transmitter activation device includes a processor configured to monitor and process data, and to automatically activate and control said removable autonomous survival emergency location transmitter when said emergency or technical problem is identified.

\* \* \* \* \*